(12) United States Patent
Huynh

(10) Patent No.: US 11,763,288 B2
(45) Date of Patent: Sep. 19, 2023

(54) NFC-RING-BASED TERMINAL-LESS PAYMENT SYSTEM

(71) Applicant: Galatea Technology LLC, San Dimas, CA (US)

(72) Inventor: Chi Huynh, San Dimas, CA (US)

(73) Assignee: GALATEA TECHNOLOGY LLC, San Dimas, CA (US)

(*) Notice: Subject to any disclaimer, the term of this patent is extended or adjusted under 35 U.S.C. 154(b) by 13 days.

(21) Appl. No.: 16/876,223

(22) Filed: May 18, 2020

(65) Prior Publication Data

US 2021/0357908 A1  Nov. 18, 2021

(51) Int. Cl.
*G06Q 20/32* (2012.01)
*G06Q 20/10* (2012.01)
*G06Q 30/04* (2012.01)
*G06Q 20/42* (2012.01)
*G06Q 40/02* (2023.01)

(52) U.S. Cl.
CPC ....... *G06Q 20/3278* (2013.01); *G06Q 20/108* (2013.01); *G06Q 20/3223* (2013.01); *G06Q 20/3263* (2020.05); *G06Q 20/42* (2013.01); *G06Q 30/04* (2013.01); *G06Q 40/02* (2013.01)

(58) Field of Classification Search
CPC .......... G06Q 20/3278; G06Q 20/3263; G06Q 20/108; G06Q 20/3223; G06Q 40/02
See application file for complete search history.

(56) References Cited

U.S. PATENT DOCUMENTS

| | | |
|---|---|---|
| 6,134,597 A | 10/2000 | Rieth et al. |
| 9,444,524 B2 | 9/2016 | Huynh |
| D786,119 S | 5/2017 | Huynh |
| 10,108,900 B2 | 10/2018 | Huynh |
| 10,509,994 B1 | 12/2019 | Huynh |
| 10,963,772 B1* | 3/2021 | Longobardi ..... G06K 19/07762 |
| 2011/0320293 A1 | 12/2011 | Khan |
| 2012/0077593 A1 | 3/2012 | Sarmenta |
| 2012/0280045 A1* | 11/2012 | Mullis ............. G06K 19/07703 235/492 |
| 2013/0124423 A1* | 5/2013 | Fisher ................... G06Q 30/02 705/72 |
| 2013/0134213 A1 | 5/2013 | Pallakoff et al. |
| 2013/0303085 A1 | 11/2013 | Boucher et al. |
| 2014/0207660 A1 | 7/2014 | Brink et al. |
| 2014/0249994 A1* | 9/2014 | Proud ..................... H02J 50/40 705/39 |
| 2014/0289832 A1 | 9/2014 | Rosenberg |
| 2015/0039494 A1* | 2/2015 | Sinton .................. G06Q 20/327 705/39 |

(Continued)

OTHER PUBLICATIONS

European Search Report dated Mar. 6, 2020 for EP Application No. 19200748.2-1213, 8 pages.

(Continued)

*Primary Examiner* — Eric T Wong
(74) *Attorney, Agent, or Firm* — Tutunjian & Bitetto, P.C.

(57) ABSTRACT

A Near Field Communication (NFC) payment system is provided for interacting with a NFC customer device enabled with a NFC scanning capability. The NFC payment system includes a NFC-scannable user-worn payment ring configured to perform a terminal-less payment transaction between itself and the NFC customer device.

17 Claims, 22 Drawing Sheets

(56) References Cited

U.S. PATENT DOCUMENTS

| | | | | |
|---|---|---|---|---|
| 2015/0042450 A1* | 2/2015 | McLear | H04B 1/385 | |
| | | | 340/5.25 | |
| 2015/0242837 A1* | 8/2015 | Yarbrough | G06Q 20/327 | |
| | | | 705/44 | |
| 2015/0294303 A1* | 10/2015 | Hanson | G06Q 20/10 | |
| | | | 235/379 | |
| 2016/0034887 A1* | 2/2016 | Lee | G06Q 20/321 | |
| | | | 705/39 | |
| 2016/0086164 A1* | 3/2016 | Griffin | H04W 12/06 | |
| | | | 705/71 | |
| 2016/0110705 A1 | 4/2016 | Papper et al. | | |
| 2016/0112097 A1 | 4/2016 | Huynh | | |
| 2016/0292563 A1* | 10/2016 | Park | G06F 3/016 | |
| 2017/0161720 A1* | 6/2017 | Xing | G06Q 20/3829 | |
| 2017/0337554 A1* | 11/2017 | Mokhasi | G06F 3/04842 | |
| 2018/0204195 A1* | 7/2018 | Kang | G06Q 20/027 | |
| 2018/0364557 A1* | 12/2018 | Park | H04N 23/651 | |
| 2019/0287083 A1* | 9/2019 | Wurmfeld | G06Q 20/321 | |
| 2019/0387848 A1* | 12/2019 | Leybourn | H04B 5/0031 | |

OTHER PUBLICATIONS

Anonymous: "Smart label—Wikipedia", last downloaded Feb. 28, 2020, available at: URL:https://en.wikipedia.org/w/index.php? title=Smart label&oldid=814224975, XP055672491, Dec. 2017, pp. 1-3.

International Search Report dated Jun. 20, 2018 for International Application No. PCT/US18/25899, 3 pages.

Office Action dated Apr. 7, 2020 for U.S. Appl. No. 15/944,083, 17 pages.

Office Action dated Apr. 73, 2018 for U.S. Appl. No. 15/944,083, 16 pages.

* cited by examiner

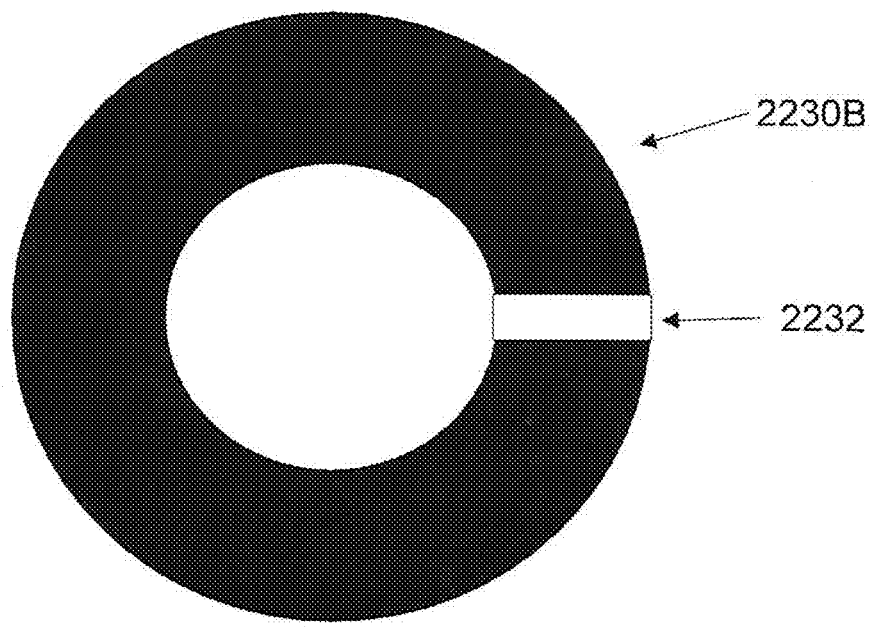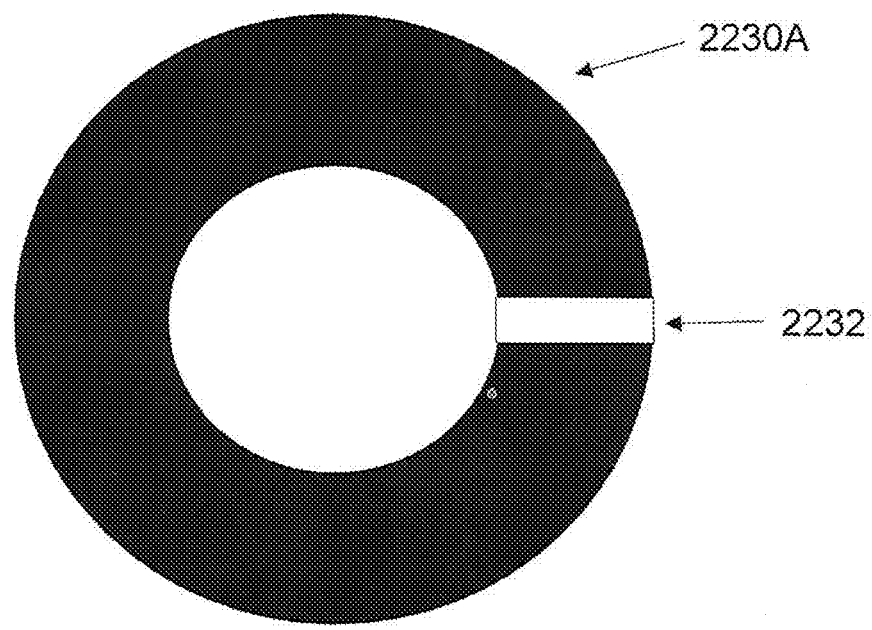
FIG. 24

NFC-RING-BASED TERMINAL-LESS PAYMENT SYSTEM

BACKGROUND

Technical Field

The present invention relates generally to Near Field Communication (NFC) devices, and more particularly to a NFC-ring-based terminal-less payment system.

Description of the Related Art

Due to the convenience of electronic payments, such payments are becoming more prevalent in our daily lives. Debit cards, credit cards, bank cards and payment processors play an increasingly important role in the transfer of settlement. There are many payment methods currently available. Among the most popular is PayPal® for web-based payments, Apple Pay® for in-store transactions, and Android Pay® for peer-to-peer transactions. All of these payment methods allow users to send and/or receive money. However, these payment methods require the user to use a checkout terminal or visit a website and use a checkout cart to make a payment. For example, payment methods such as Apple Pay®, Samsung Pay®, Square®, and Android Pay® require a terminal to read a credit card number on a user's phone to process the user's transaction. The VISA® payment ring also requires a terminal to process the user's transaction. The VISA®-based payment ring is an NFC ring that lets you tap to pay at a store terminal without a phone or smart watch. As with the Apple Watch®, you do not need your phone around once the VISA®-based payment ring has been set up. Hence, there is a need for a faster and new payment process whereby users can buy and pay for products directly without having to use a store payment terminal, company website, or cashier.

SUMMARY

According to aspects of the present invention, a Near Field Communication (NFC) payment system is provided for interacting with a NFC customer device enabled with a NFC scanning capability. The NFC payment system includes a NFC-scannable user-worn payment ring configured to perform a terminal-less payment transaction between itself and the NFC customer device.

According to other aspects of the present invention, a method is provided for using Near Field Communication (NFC) to interact with a NFC customer device enabled with a NFC scanning capability. The method includes configuring a NFC-scannable user-worn payment ring to perform a terminal-less payment transaction between itself and the NFC customer device.

According to yet other aspects of the present invention, a computer program product is provided for using Near Field Communication (NFC) to interact with a NFC customer device enabled with a NFC scanning capability. The computer program product includes a non-transitory computer readable storage medium having program instructions embodied therewith. The program instructions are executable by a computer to cause the computer to perform a method. The method includes configuring a NFC-scannable user-worn payment ring to perform a terminal-less payment transaction between itself and the NFC customer device.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 24 depicts slotted 2232 collars 2230A, 2230B, in accordance with an embodiment of the present invention.

DETAILED DESCRIPTION

The present invention is directed to a NFC-ring-based terminal-less payment system.

Embodiments of the present invention provide a communication-lockable NFC-scannable user-worn payment ring configured to perform a terminal-less payment transaction between itself and the customer device. Embodiments of the present invention can involve terminal-less payment transactions where the ring wearer pays another entity as well as terminal-less payment transactions where the ring wearers gets paid by another entity. In this way, the ring is payment receive and payment send enabled.

Embodiments of the present invention avoid the need for using a terminal, that is, a device common to multiple users with which the multiple users interface. In contrast, financial transactions are performed using hardware under the physical control of the user such that each user in a set of users use their own respective devices (e.g., a ring and a smart phone). That is, an embodiment of the present invention can be performed where the only involved devices that the user directly interfaces with are their ring that they wear on their finger (or as a pendent, etc.) and a mobile device such as their mobile smart phone. No common user terminal, that is a terminal shared by more than one user, is required. In this way, data stealing, and many other detrimental effects of terminal-based systems are avoided.

Embodiments of the present invention provide an electronic payment system where the user has on their person all that is required to perform a payment transaction and does not require a store payment terminal, a company website or a cashier. As both the ring and the customer device (smart phone) are personal to (that is, carried/worn by) each user, the user is presumed to always be in possession of these items, thus enabling transaction on the fly, wherever the user is, independent of any store payment terminal, as well independent of any company website or cashier. Thus, embodiments of the present invention provide a safe and secure way to make or receive a payment without having to contact, or even come close to contacting, a common terminal required of everyone performing a payment transaction therewith.

Embodiments of the present invention provide a terminal-less payment that involves a communication-lockable NFC-scannable user-worn payment ring that can be in the form of actual jewelry made of precious metals including, but not limited to, Gold, Silver, Platinum, and so forth.

Embodiments of the present invention provide a user-settable physical communication lock enabled payment ring so that hacking of the ring can be altogether avoided due to a complete blocking of any NFC signal to the NFC chip comprised in the ring.

The ring is basically configured as the payment receive or send entity that stores banking or other payment (e.g., credit/debit card) information to which payments are made and from which payments are received.

Figure 1:
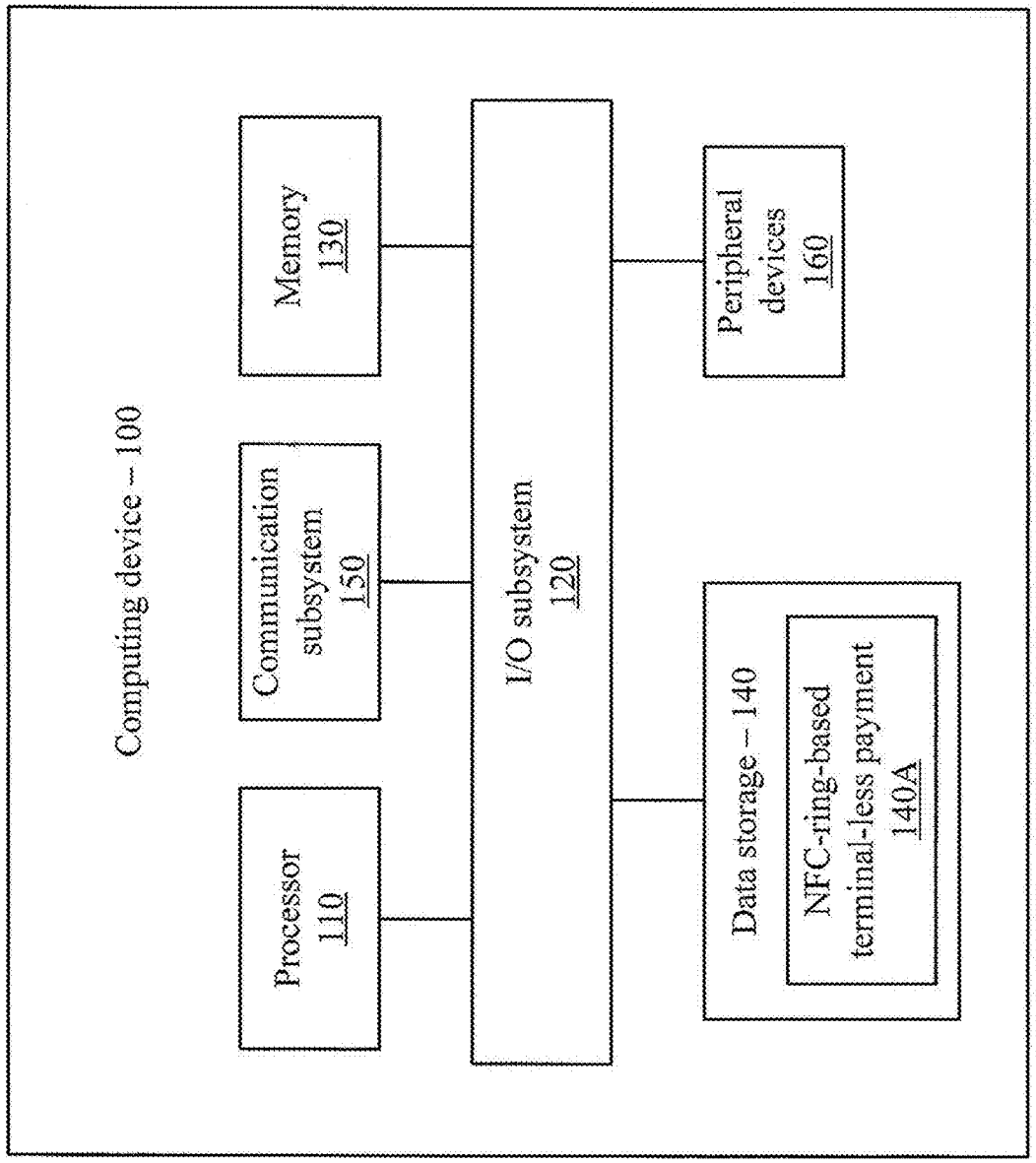
FIG. 1 is a block diagram showing an exemplary computing device 100, in accordance with an embodiment of the present invention.

Referring to FIG. 1, an exemplary computing device 100 is shown, in accordance with an embodiment of the present invention. Computing device 100 can be payment server 230 in FIG. 2, in accordance with one implementation of the payment server 230. The computing device 100 is configured to perform NFC-ring-based terminal-less payment by interacting with a customer device as user NFC device 210 of FIG. 2.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for NFC-ring-based terminal-less payment. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used. For example, computing device 100 can be deployed as a Platform as a Service (PaaS), or Infrastructure as a Service (IaaS), and so forth. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
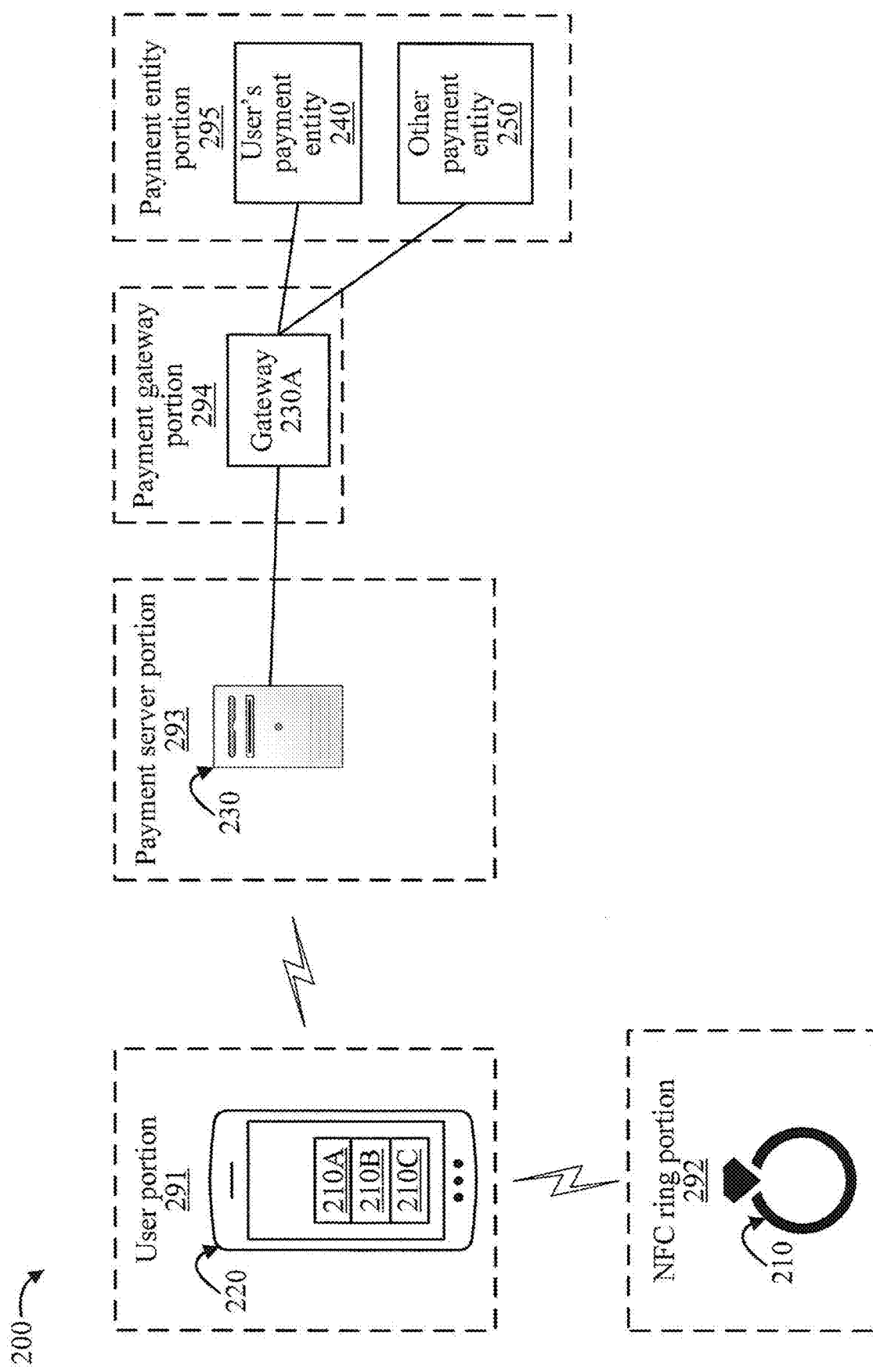
FIG. 2 is a block diagram showing an exemplary environment 200, in accordance with an embodiment of the present invention.

These and other variations of a hardware processor subsystem are also contemplated in accordance with embodiments of the present invention Referring to FIG. 2, an environment 200 is shown, in accordance with an embodiment of the present invention.

The environment 200 includes various portions relating to various entities capable of being involved in embodiments of the present invention. The various portions include a user device portion 291, a ring portion 292, a payment server portion 293, a payment gateway portion 294, and a bank portion 295.

The parties/entities involved in a transaction cycle 299 can include a user 201, a user NFC mobile device (hereinafter interchangeable referred to as "customer device") 210 (as part of the user device portion 291), a NFC jewelry device 220 (as part of ring portion 292), a payment server 230 (as part of payment server portion 293), a user's payment entity 240 (as part of payment entity portion 295), and another payment entity (e.g., merchant's payment entity) 250 (as part of payment entity portion 295.

The parties/entities involved in the transaction cycle 299 can communicate using any known communication methodologies including wired and/or wireless technologies and encryption/decryption. Thus, while wireless communications are shown between the user NFC device 210 and the NFC jewelry device 220 and between the user NFC device 210 and the payment server 230, wired or preferably wireless communications can be used between the parties/entities of environment 200.

The user NFC mobile device 210 can be, for example, but is not limited to, a smart phone, a smart watch, a tablet, a laptop, a media device, and so forth. Preferably, the user NFC device 210 is a device typically carried by the user 201 on his or her person such as a smart phone or smart watch. The user NFC mobile device 210 includes a local application 210A running thereon. The local application 210A interfaces with the payment server 230 to provide a transparent interaction with the payment server 230 through the local application 210A.

The user NFC mobile device 210 has a NFC scanning capability, via a NFC scanner 210B, for scanning the NFC jewelry device 220. The user NFC mobile device 210 further can have another type of communication capability, via a transceiver 210C, for communicating with the payment server 230. For example, cellular, WIFI, Bluetooth, and so forth can be used. Preferably, a secure communication involving encryption is used.

The NFC jewelry device 220 includes a processor 220A, a memory 220B, and an antenna 230C. The NFC jewelry device 220 can be as described in further detail herein. The NFC jewelry device 220 acts as a key to the payment transaction in the first place as well as to the private payment information of the user 201 to support the payment transaction.

The payment server 230 can provide a payment application, and a checkout webpage payment gateway (hereinafter "payment gateway" in short) 230A, or the payment gateway 230A can be a separate entity as shown.

The payment gateway 230A is a merchant service provided by an e-commerce application service provider that authorizes credit card or direct payments processing for e-businesses, online retailers, bricks and clicks or traditional brick and mortars. The payment gateway 230A may be provided by a bank to its customers, but can be provided by a specialized financial service provider as a separate service, such as a payment service provider.

The payment gateway 230A facilitates a payment transaction by the transfer of information between a payment portal (such as a website, mobile phone or interactive voice response service) and the front end processor or acquiring bank.

In an embodiment, the payment gateway 230A can include, for example, but is not limited to, payment services such as, for example, but not limited to, PayPal®, and so forth.

The transaction part between the payment server 230 and the user NFC mobile device 210 is transparent to the user, and the user interfaces through the local application 210A on the user device and is not made aware of any down-steam processing.

The payment server 230 manages payment transactions. Such management can involve, for example, but is not limited to, maintaining mappings and/or listings of (i) sellers to products for sale, (iii) prices and other product information for the products, and (iii) profile and other information for the sellers, generating invoice information, maintaining sale records, and so forth.

The payment server 230 can be part of a computing platform 270 for implementing one or more embodiments of the present invention. In an embodiment, a cloud computing platform can be used. In an embodiment, the payment server 230 can be implemented as one or more nodes in a cloud computing environment. While one payment server 230 is shown in the illustrative example of FIG. 2, in other embodiments, more than one server can be used, with each corresponding to a particular seller or subset of sellers depending upon the implementation.

The user's payment entity 240 can be, for example, but is not limited to, a digital wallet a bank, a credit/debit card entity, and so forth. In an embodiment, the user's electronic wallet is a cryptocurrency wallet.

The other payment entity (e.g., a merchant's payment entity) 250 can be, for example, but is not limited to, a digital wallet a bank, a credit/debit card entity, and so forth. In an embodiment, the merchant's electronic wallet is a cryptocurrency wallet.

A user identifier and payment information relating to a user payment entity are output to the user NFC mobile device 210 for temporary storage responsive to a payment initiating scan of the NFC-scannable user-worn payment ring by the user NFC mobile device 210. The user identifier and the payment information are temporarily stored in the user NFC mobile device 210 and thereafter discarded responsive to a transmission of the user identifier and the payment to the remote payment server 230 configured to process the user identifier and the payment information to complete the terminal-less payment transaction.

The payment information can be, for example, but is not limited to, the user's identification, a bank routing number, a credit/debit card number, and so forth.

The user identifier and the payment information can be output using an encrypted communication protocol. The encrypted communication protocol can involve Secure Sockets Layer (SSL) communications, Transport Layer Security (TLS) communications, Internet Protocol security (IPsec), Secure Shell(SSH®), and so forth.

FIGS. 3-4, 5-7, 8-10, and 11 are respective flow diagrams for showing different exemplary methods 300, 500, 800, and 1100 in accordance with various embodiments of the present invention.

Figure 3:
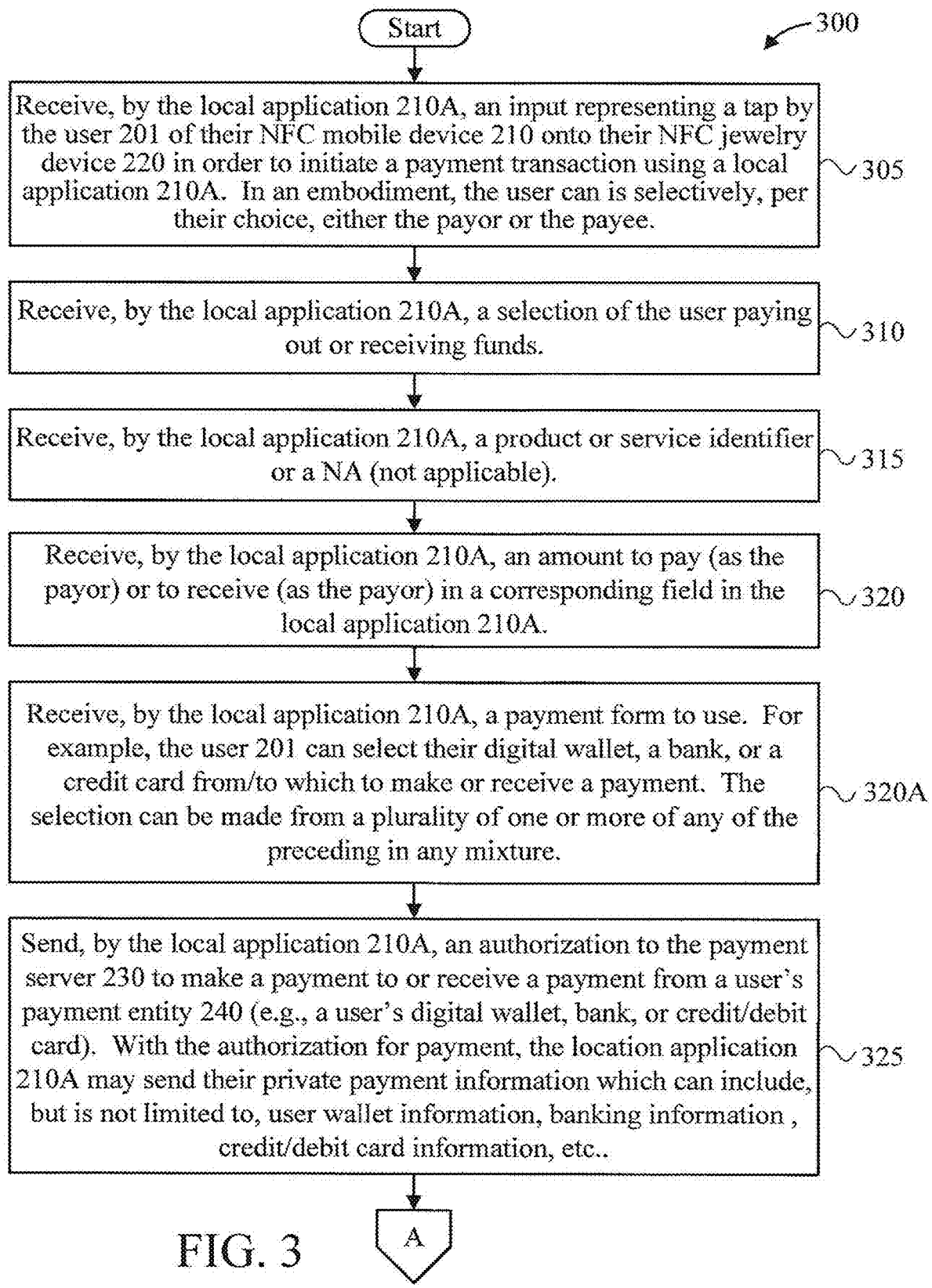
FIGS. 3-4 are flow diagrams showing an exemplary method 300 for performing a ring-based payment transaction, in accordance with an embodiment of the present invention.
Figure 4:
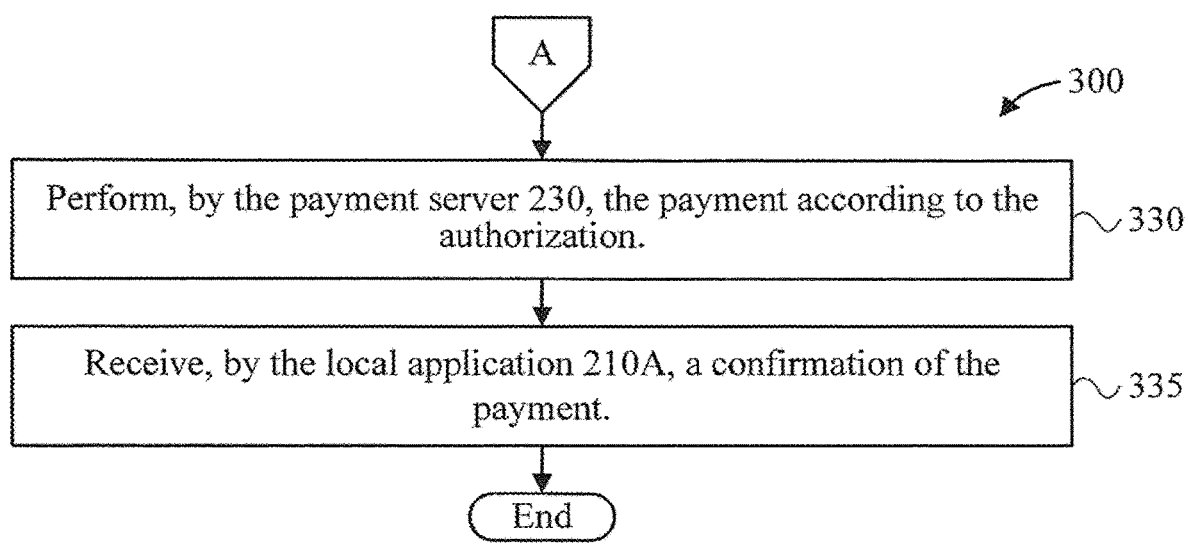
Figure 5:
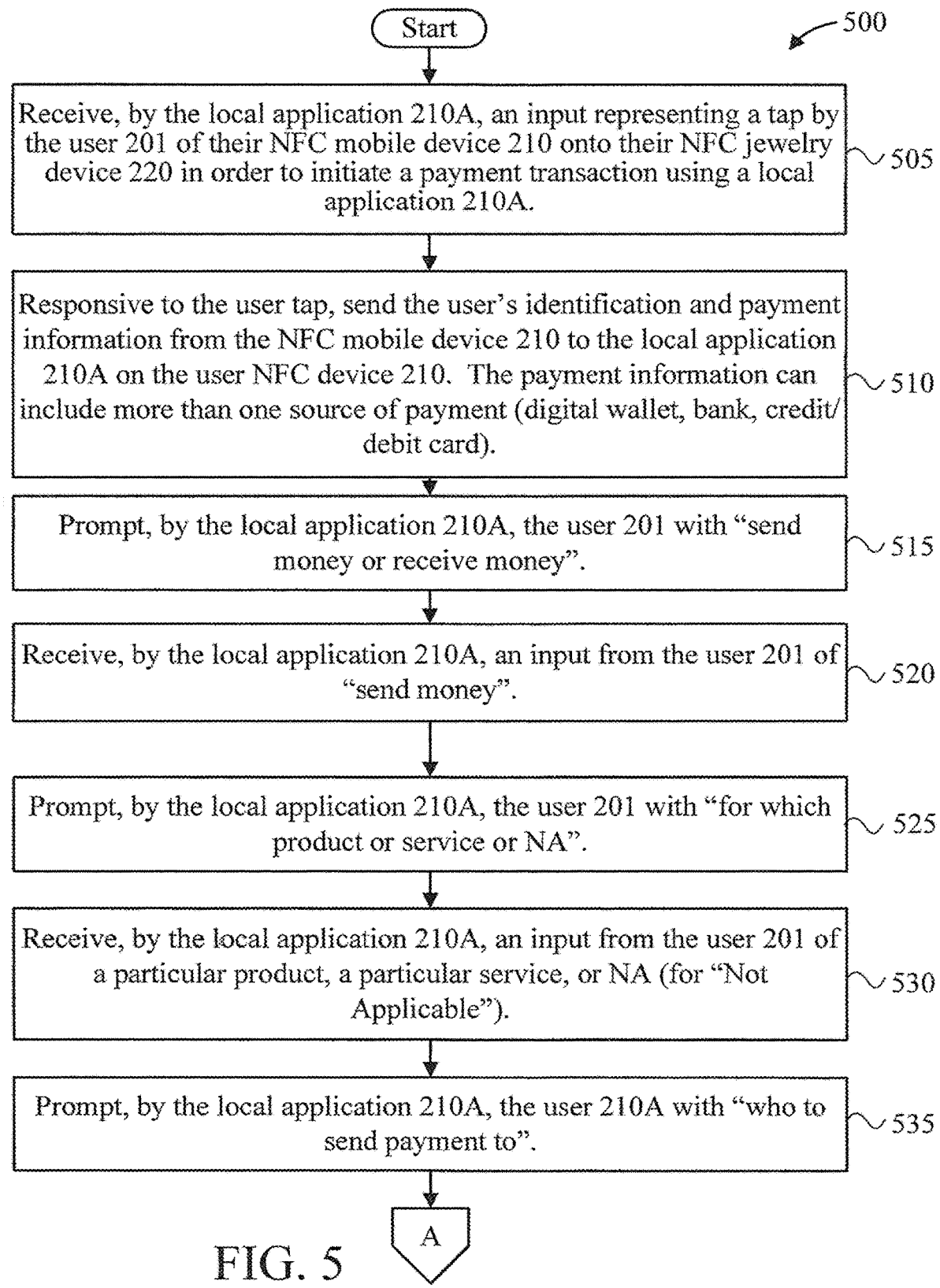
FIGS. 5-7 are flows diagram showing an exemplary method 500 for making a payment using a ring-based payment transaction, in accordance with an embodiment of the present invention.
Figure 6:
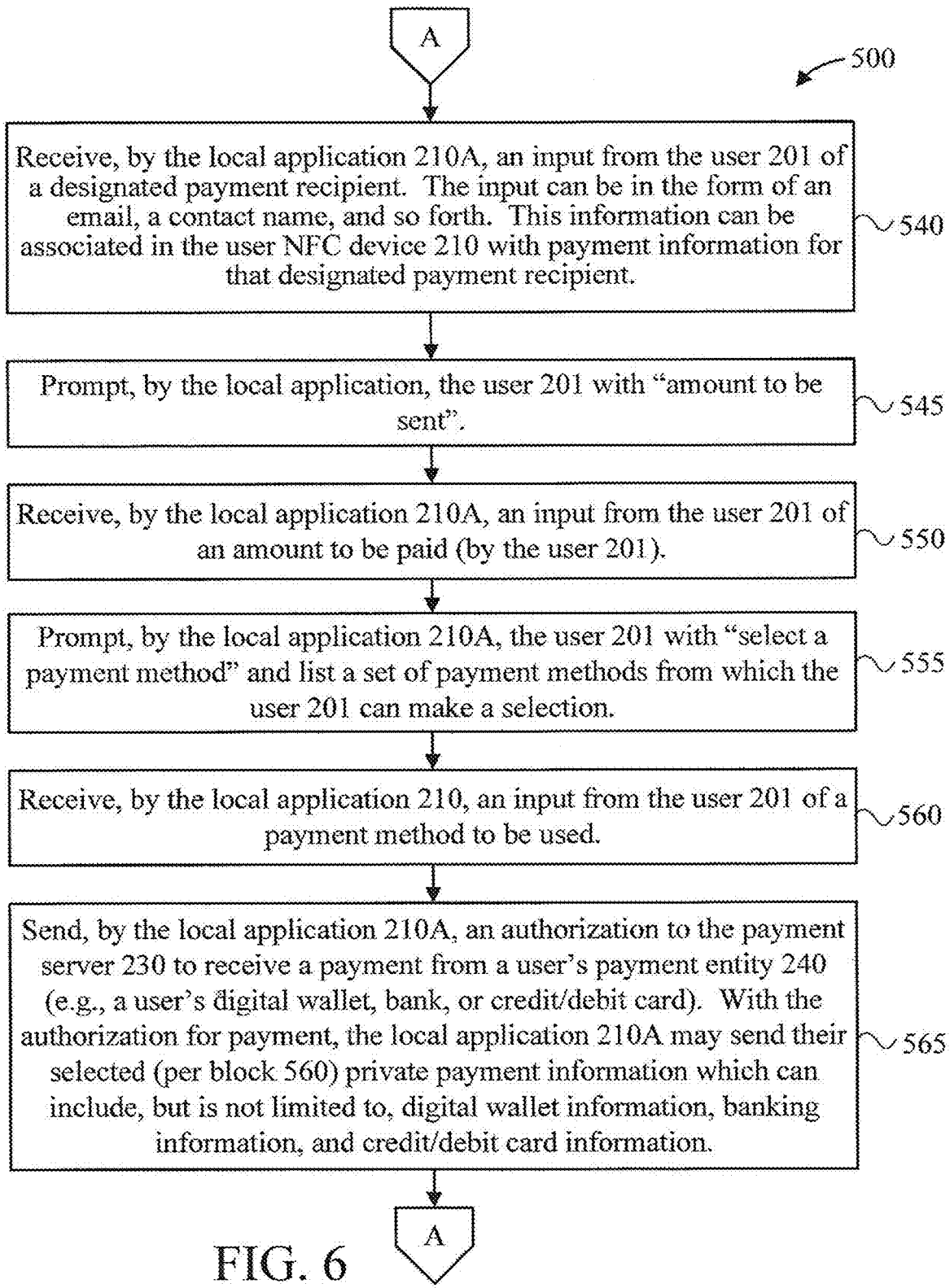
Figure 7:
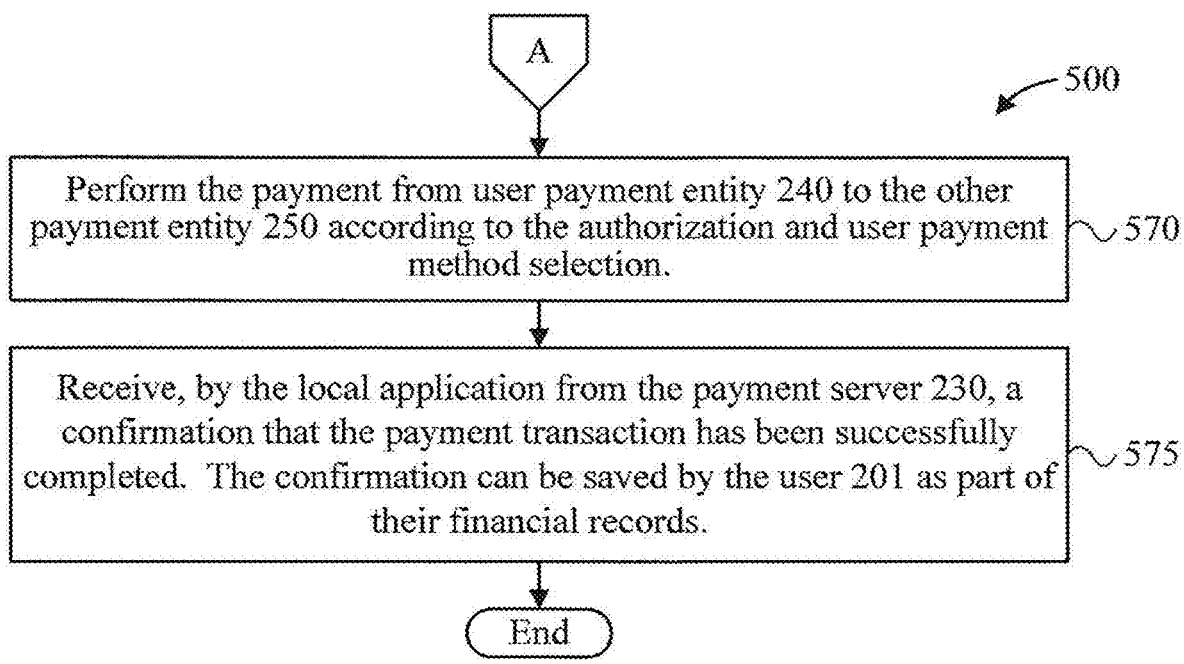
Figure 8:
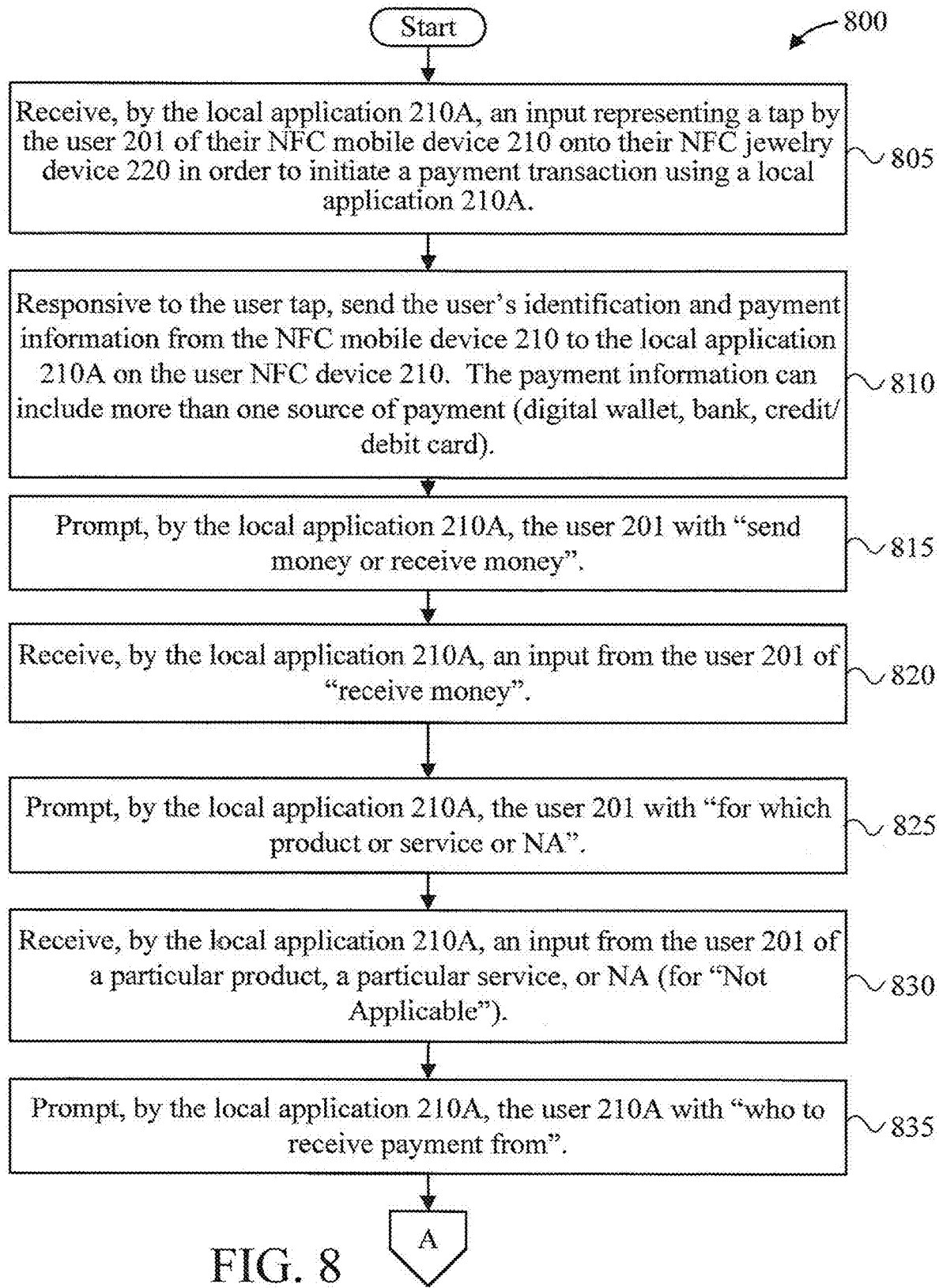
FIGS. 8-10 are flows diagram showing an exemplary method 800 for receiving a payment using a ring-based payment transaction, in accordance with an embodiment of the present invention.
Figure 9:
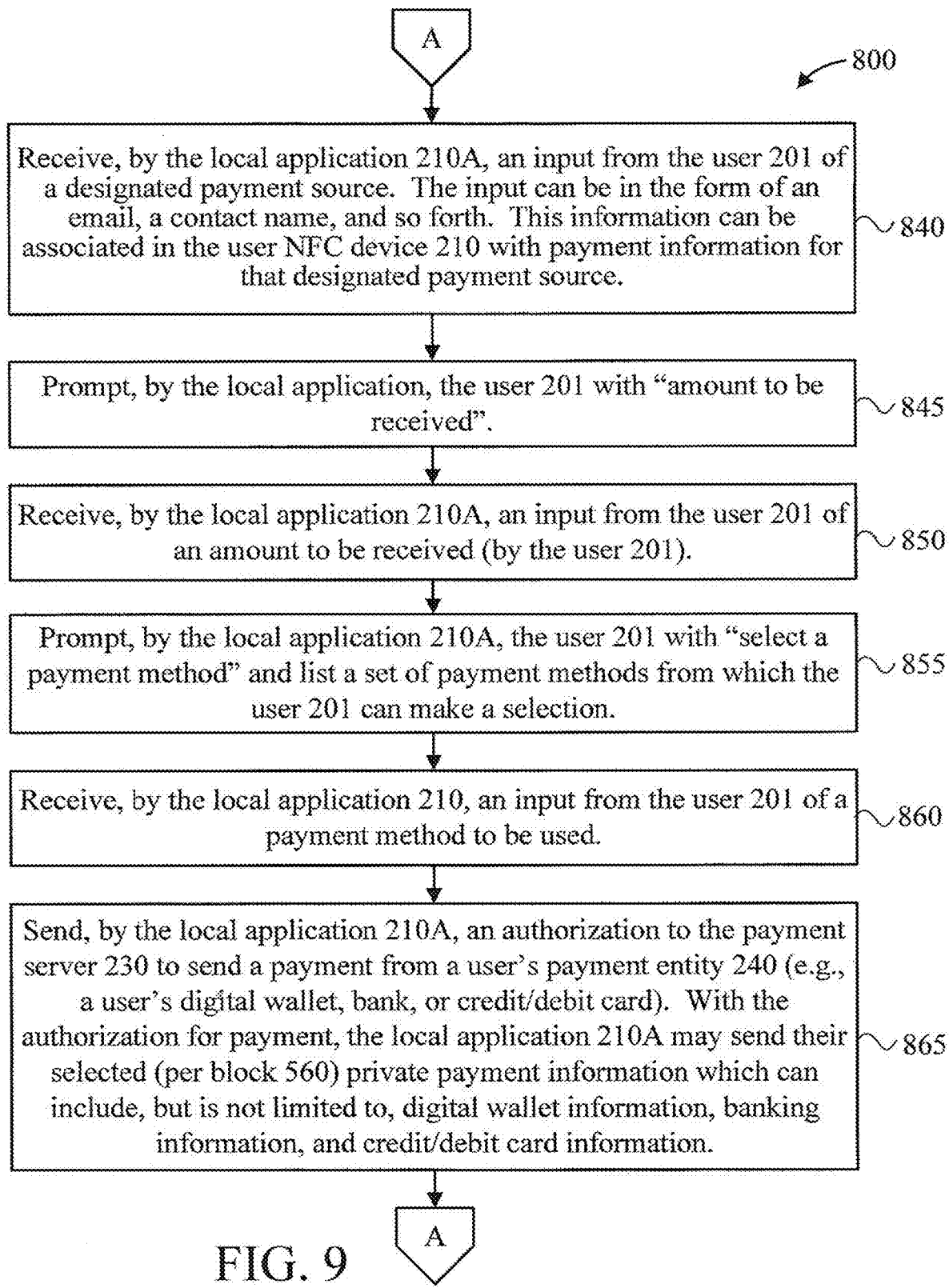
Figure 10:
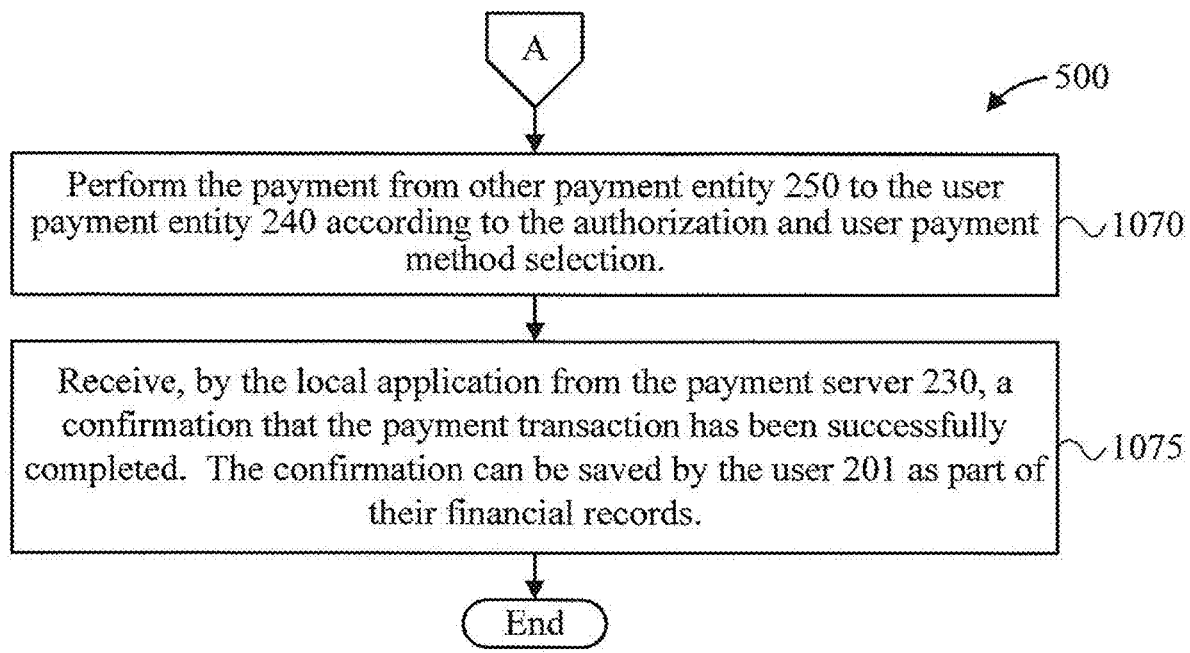
Figure 11:
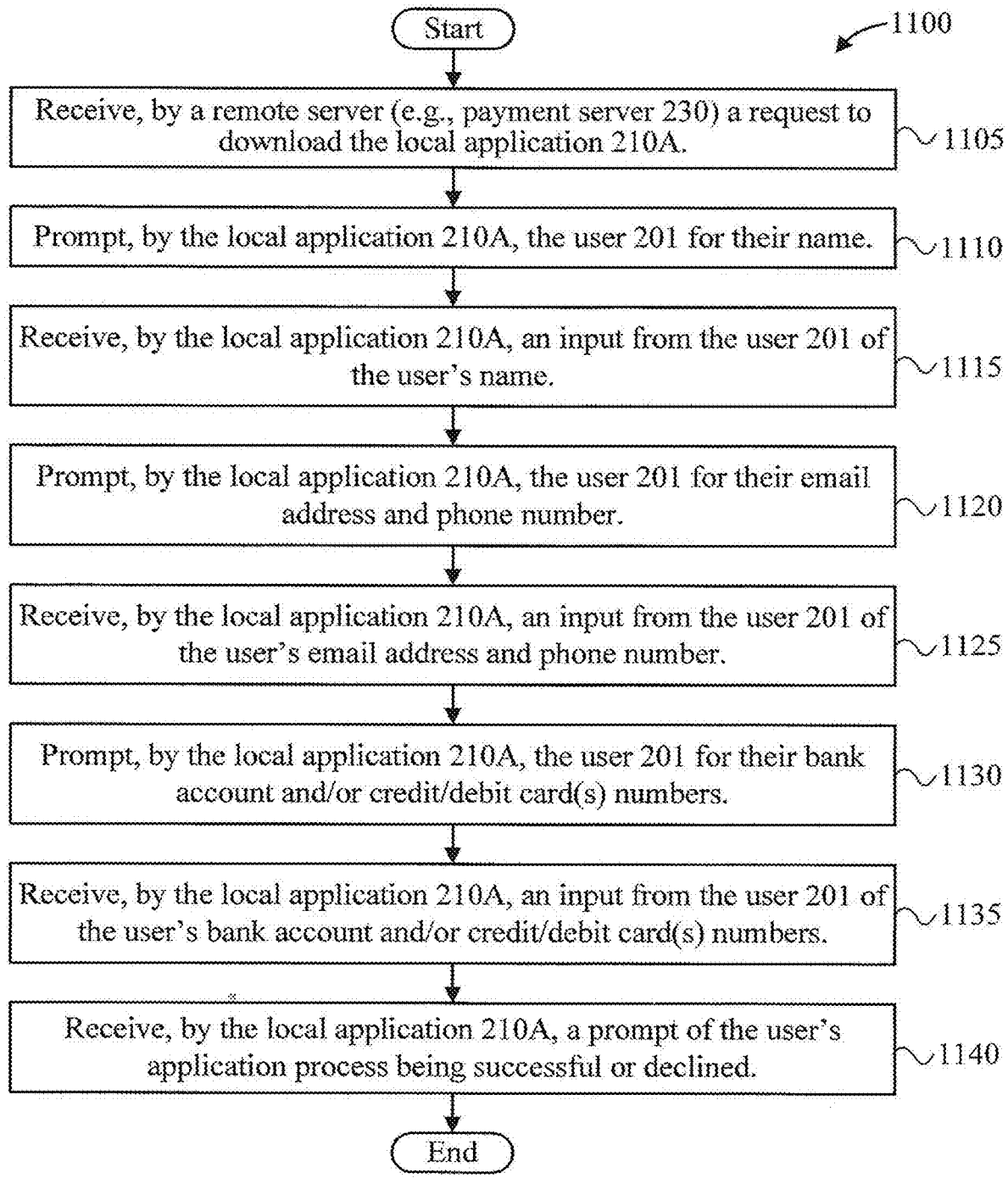
FIG. 11 is a flow diagram showing an exemplary method 1100 for registering with the local application 210A, in accordance with an embodiment of the present invention.

FIGS. 3-4 show an overall method 300 for performing a ring-based payment transaction, FIGS. 5-7 show a method 500 for specifically performing a ring-based payment transaction where the user is the payor, FIGS. 8-10 show a method 800 for specifically performing a ring-based payment transaction where the user is the payee, and FIG. 11 shows a method 1100 for setting up the NFC user device 210.

Referring to FIGS. 3-4, an exemplary method 300 is shown for performing a ring-based payment transaction, in accordance with an embodiment of the present invention.

At block 305, receive, by the local application 210A, an input representing a tap by the user 201 of their NFC mobile device 210 onto their NFC jewelry device 220 in order to initiate a payment transaction using a local application 210A. In an embodiment, the user can is selectively, per their choice, either the payor or the payee.

At block 310, receive, by the local application 210A, a selection of the user paying out or receiving funds.

At block 315, receive, by the local application 210A, a product or service identifier or a NA (not applicable).

At block 320, receive, by the local application 210A, an amount to pay (as the payor) or to receive (as the payor) in a corresponding field in the local application 210A.

In an embodiment, block 320 can include block 320A. Block 320A pertains to a user selection from among a plurality of payment types. In other embodiments, one payment can be hardwired or used by default but able to be changed to another type by a user at a user's discretion, through the local application 210A.

At block 320A, receive, by the local application 210A, a payment form to use. For example, the user 201 can select their digital wallet, a bank, or a credit card from/to which to make or receive a payment. The selection can be made from a plurality of one or more of any of the preceding (e.g., multiple credit cards) in any mixture (e.g., but not limited to, 1 digital wallet, 2 banks, 4 credit cards, 1 debit card, and so forth).

At block 325, send, by the local application 210A, an authorization to the payment server 230 to make a payment to or receive a payment from a user's payment entity 240 (e.g., a user's digital wallet, bank, or credit/debit card). With the authorization for payment, the location application 210A may send their private payment information which can include, but is not limited to, user wallet information, banking information (e.g., user name, user's bank name, user's account and routing numbers, etc.), and credit/debit card information (e.g., name on card, number, expiration, CVC, etc.) etc.

At block 330, perform, by the payment server 230, the payment according to the authorization. This can, as mentioned above, involve the user 201 being the payor (and paying out funds from their user's payment entity 240) or the payee (and receiving funds to their user's payment entity 240).

At block 335, receive, by the local application 210A, a confirmation of the payment.

Referring to FIGS. 5-7, an exemplary method 500 is shown for making a payment using a ring-based payment transaction, in accordance with an embodiment of the present invention.

At block 505, receive, by the local application 210A, an input representing a tap by the user 201 of their NFC mobile device 210 onto their NFC jewelry device 220 in order to initiate a payment transaction using a local application 210A.

At block 510, responsive to the user tap, send the user's identification and payment information from the NFC mobile device 210 to the local application 210A on the user NFC device 210. The payment information can include more than one source of payment (digital wallet, bank, credit/debit card).

At block 515, prompt, by the local application 210A, the user 201 with "send money or receive money".

At block 520, receive, by the local application 210A, an input from the user 201 of "send money".

At block 525, prompt, by the local application 210A, the user 201 with "for which product or service or NA".

At block 530, receive, by the local application 210A, an input from the user 201 of a particular product, a particular service, or NA (for "Not Applicable").

At block 535, prompt, by the local application 210A, the user 210A with "who to send payment to".

At block 540, receive, by the local application 210A, an input from the user 201 of a designated payment recipient. The input can be in the form of an email, a contact name, and so forth. This information can be associated in the user NFC device 210 with payment information for that designated payment recipient.

At block 545, prompt, by the local application, the user 201 with "amount to be sent".

At block 550, receive, by the local application 210A, an input from the user 201 of an amount to be paid (by the user 201).

At block 555, prompt, by the local application 210A, the user 201 with "select a payment method" and list a set of payment methods from which the user 201 can make a selection.

At block 560, receive, by the local application 210, an input from the user 201 of a payment method to be used.

At block 565, send, by the local application 210A, an authorization to the payment server 230 to receive a payment from a user's payment entity 240 (e.g., a user's digital wallet, bank, or credit/debit card). With the authorization for payment, the local application 210A may send their selected (per block 560) private payment information which can include, but is not limited to, digital wallet information, banking information (e.g., user name, user's bank name, user's account and routing numbers, etc.), and credit/debit card information (e.g., name on card, number, expiration, CVC, etc.).

At block 570, perform the payment from user payment entity 240 to the other payment entity 250 according to the authorization and user payment method selection.

At block 575, receive, by the local application from the payment server 230, a confirmation that the payment transaction has been successfully completed. The confirmation can be saved by the user 201 as part of their financial records.

Referring to FIGS. 8-10, an exemplary method 800 is shown for receiving a payment using a ring-based payment transaction, in accordance with an embodiment of the present invention.

At block 805, receive, by the local application 210A, an input representing a tap by the user 201 of their NFC mobile device 210 onto their NFC jewelry device 220 in order to initiate a payment transaction using a local application 210A.

At block 810, responsive to the user tap, send the user's identification and payment information from the NFC mobile device 210 to the local application 210A on the user NFC device 210. The payment information can include more than one destination for payment (digital wallet, bank, credit/debit card).

At block 815, prompt, by the local application 210A, the user 201 with "send money or receive money".

At block 820, receive, by the local application 210A, an input from the user 201 of "receive money".

At block 825, prompt, by the local application 210A, the user 201 with "for which product or service or NA".

At block 830, receive, by the local application 210A, an input from the user 201 of a particular product, a particular service, or NA (for "Not Applicable").

At block 835, prompt, by the local application 210A, the user 210A with "who to receive payment from".

At block 840, receive, by the local application 210A, an input from the user 201 of a designated payment source. The input can be in the form of an email, a contact name, and so forth. This information can be associated in the user NFC device 210 with payment information for that designated payment source.

At block 845, prompt, by the local application, the user 201 with "amount to be received".

At block 850, receive, by the local application 210A, an input from the user 201 of an amount to be received (by the user 201).

At block 855, prompt, by the local application 210A, the user 201 with "request and receive a payment method" and list a set of payment methods from which the user 201 can make a selection.

At block 860, receive, by the local application 210, an input from the user 201 of a payment method to be used.

At block 865, send, by the local application 210A, an authorization to the payment server 230 to receive a payment by a user's payment entity 240 (e.g., a user's digital wallet, bank, or debit card). With the authorization for payment, the local application 210A may send their selected (per block 860) private payment information which can include, but is not limited to, digital wallet information, banking information (e.g., user name, user's bank name, user's account and routing numbers, etc.), and debit card information (e.g., name on card, number, expiration, CVC, etc.).

At block 870, perform the payment from the other payment entity 250 to the user payment entity 240 according to the authorization and user payment method selection.

At block 875, receive, by the local application from the payment server 230, a confirmation that the payment transaction has been successfully completed. The confirmation can specify who paid the user, how much the user was paid, for what the user was paid, and what day the user way paid (selectively including the time of day). The confirmation can be saved by the user 201 as part of their financial records.

Referring to FIG. 11, an exemplary method 1100 is shown for registering with the local application 210A, in accordance with an embodiment of the present invention.

At block 1105, receive, by a remote server (e.g., payment server 230) a request to download the local application 210A.

At block 1110, prompt, by the local application 210A, the user 201 for their name.

At block 1115, receive, by the local application 210A, an input from the user 201 of the user's name.

At block 1120, prompt, by the local application 210A, the user 201 for their email address and phone number.

At block 1125, receive, by the local application 210A, an input from the user 201 of the user's email address and phone number.

At block 1130, prompt, by the local application 210A, the user 201 for their bank account and/or credit/debit card(s) numbers.

At block 1135, receive, by the local application 210A, an input from the user 201 of the user's bank account and/or credit/debit card(s) numbers.

At block 1140, receive, by the local application 210A, a prompt of the user's application process being successful or declined.

A description will now be given regarding an exemplary scenario to which the present invention can be applied. The following description will now be given relative to FIGS. 12 and 13, which are block diagrams showing an exemplary payment scenario 1200 and displayed screen 1300 on a customer device 210, in accordance with an embodiment of the present invention. The displayed screen 1300 of FIG. 13 is further to the payment scenario of FIG. 12.

Figure 12:
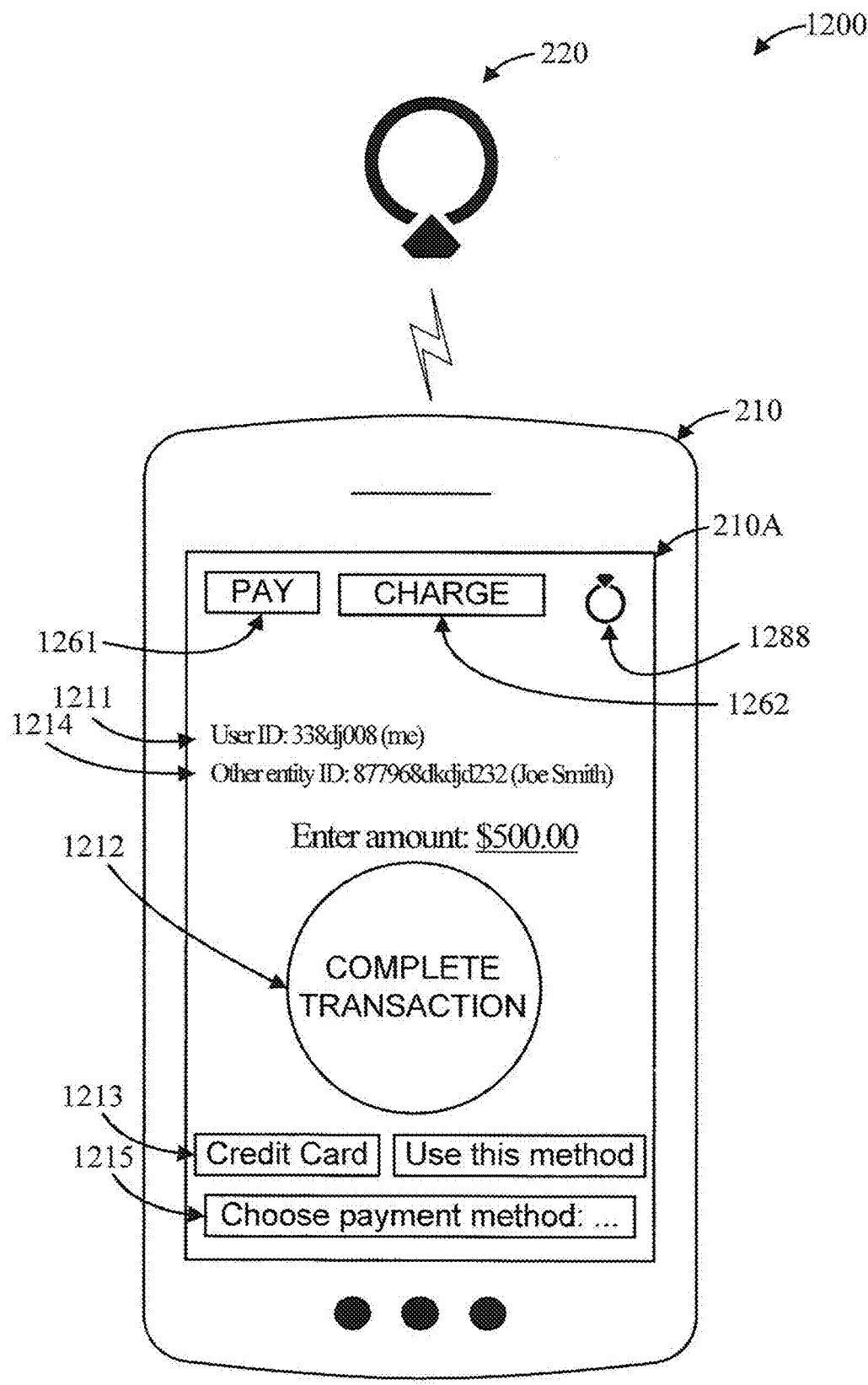
FIG. 12 is a block diagram showing an exemplary payment scenario 1200, in accordance with an embodiment of the present invention.
Figure 13:
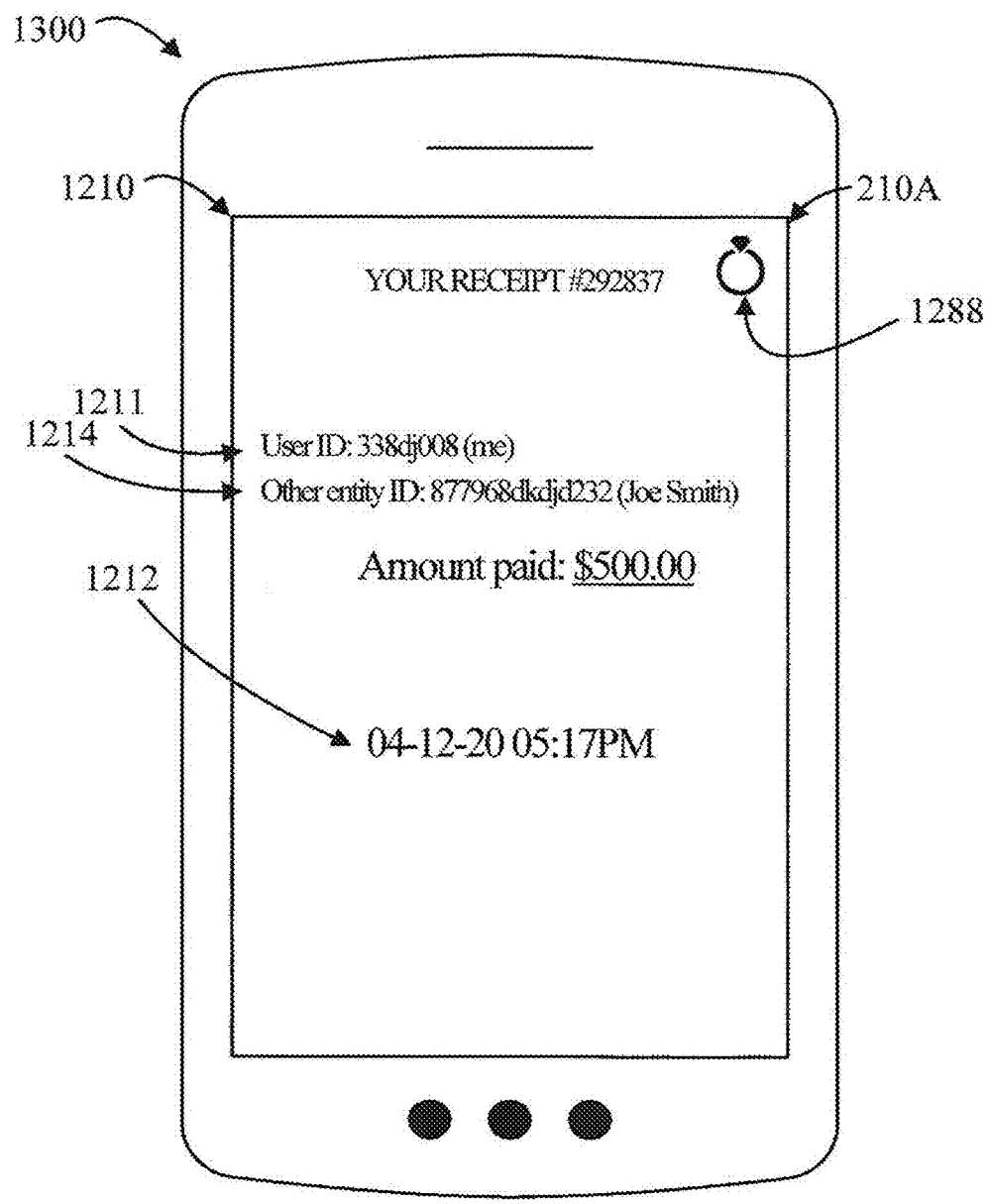
FIG. 13 is a block diagram showing an exemplary displayed screen 1210 on a customer device, in accordance with an embodiment of the present invention.

Referring to FIGS. 12-13, a user 201 receives a telephone call from a friend requesting a loan. The friend is remote from the user 201. The user 201 wants to help his friend and is willing to loan his friend $500. The user 201 performs method 500 of FIGS. 5-7 to send his friend the money.

The user 201 taps his customer device 210 to the NFC jewelry device 220 to activate the local application 210A. To show the user that a scan has been performed that has resulted in the start of a payment transaction (i.e., an exchange of payment information from the ring 220 to the NFC user device 210), a ring symbol 1288 is shown to denote connectivity to the ring in support of the transaction. The user 201 then enters their user ID 1211, which can be remembered by their customer device 210 and automatically filled in by the customer device 210. The user 201 can then fill in the ID of a party to be paid or to receive payment from.

The user 201 then selects "PAY" 1261 or "CHARGE" 1262. Also involved are a pre-selected "payment method" button 1213 as well as a selection mechanism 1215 for selecting other payment methods.

The user then taps a "Complete transaction" button 1212.

Referring to FIG. 13, the user 201 will see a receipt 1210 popping up on his phone showing Hence, the user did not have to search for a company web address or use a terminal, thus making the user have a quick and efficient payment experience.

Regarding the receipt 1210, note that the same shows a user ID 1211 and the another entity ID 1214, as well as a time 1220 of payment, an amount paid (in this case, otherwise, "amount received") 1221, and a receipt number 1222.

A description will now be given regarding the NFC jewelry device 220, in accordance with one or more embodiments of the present invention.

The term "precious gem" as used herein refers to a precious stone for ornamentation. The term "semi-precious gem" as used herein refers to a semi-precious stone for ornamentation. A "semi-precious gem" is also intended to encompass an artificial gem or a replica of a gem.

The term "opaque" as used herein refers to the inability to see through a material across the visible spectrum. An "opaque layer" is not transparent. An "opaque layer" may be reflective.

The term "electrically conductive material" or "conductive material" as used herein refers to a material that conducts electricity such that if completely surrounding a NFC chip at a distance of about 5 mm would prevent near field communication with the encircled NFC chip. The most electrically conductive element is silver, followed by copper and gold, each of which is highly electrically conductive. The SI unit for conductivity S/m. A "highly electrically conductive material" as used herein is 10'S/m or more and is the preferred material for the bezel. "Lesser conductive materials" as used herein refers to a material having a conductivity of about 106 S/m. "Lesser conductive materials" can be suitable for connectors but do not tend to be sufficiently efficient for use as the bezel itself. "Lesser conductive materials" can include titanium or titanium alloy as used in the jewelry industry. "Nonconductive materials" are also termed "insulators." "Nonconductive materials" can include various polymers including plastics, rubbers, glass and ceramics and are not suitable for either the bezel or connector but are suited for collars.

The term "continuous loop" as used herein refers to a loop that does not end. The term "electrically conductive continuous loop" or "continuous electrically conductive loop" as used herein refers to a material that permits an electrical charge to continue around a loop many times.

The term "NFC interfering loop" as used herein refers to a loop of "conductive material" with or without and amount of "lesser conductive material" to prevent near field communication with a surrounded NFC chip.

The term "near field communication chip" or "NFC chip" as used herein refers to an unpowered chip capable of acting as a passive target under near field communication standards as known in the electronic communication arts. The "near field communication signal" typically operates within a distance of about 4-10 cm or less and at a frequency of about 13.56 MHz.

Near field communication operates using electromagnetic induction between two loop antennas located within each other's near field, effectively forming an air-core transformer between an initiator and target. More specifically an initiator device provides a carrier field, and the target device answers by modulating the existing field. Thus, the NFC chip draws its operating power from the initiator-provided electromagnetic field. An "NFC enabled device" as used herein refers to a device such as a smart phone or a tablet computer that acts as an initiator to power the NFC chip. NFC chips include a loop antenna and memory that currently stores between about 96 bytes and 4 MB. NFC chips can be read only but are preferably rewritable. Reading and writing to an NFC chip can be performed using an NFC enabled device loaded with NFC software. The term "NFC chip" is intended to encompass current near field communication standards as well as further improvements that can operate in connection with remaining elements that form the article of jewelry.

The term "substantially surrounding" or "substantially around the outer perimeter" as used herein refers to an extension that surrounds between 85% and less than 100%, more preferably 90%-99.9% of the outer perimeter or circumference of the NFC chip. In further embodiments, 90%-95% of the outer perimeter or circumference of the NFC chip is surrounded by the electrically conductive material of the bezel even when in the open configuration.

In some embodiments, at least 95% of the outer perimeter or circumference of the NFC chip is surrounded by the electrically conductive material of the bezel. In further embodiments, at least 96% of the outer perimeter or circumference of the NFC chip is surrounded by the electrically conductive material of the bezel. In further embodiments, at least 97% of the outer perimeter or circumference of the NFC chip is surrounded by the electrically conductive material of the bezel. In further embodiments, at least 98% of the outer perimeter or circumference of the NFC chip is surrounded by the electrically conductive material of the bezel. In further embodiments, at least 99% of the outer perimeter or circumference of the NFC chip is surrounded by the electrically conductive material of the bezel. The electrically conductive material of the bezel does not surround 100% of the perimeter or circumference of the NFC chip when in the open configuration.

The term "distance of communication" as used herein refers to the maximum distance in which an NFC enabled device can receive instructions or a message from an NFC chip. The "distance of communication" is typically less than 10 cm and preferably 4 cm or less.

Referring collectively to FIGS. 14-17, article of jewelry 220 is provided, which includes a precious or semi-precious gem 1412; a near field communication (NFC) chip 1414; and a bezel 1416. The bezel 1416, which includes an electrically conductive material, is positioned along a same plane as the NFC chip 1414. The bezel 1414 is switchable between a closed configuration defined by a continuous electrically conductive loop (shown in FIGS. 16 and 18) around the NFC chip and an open configuration defined by a gap 1420 preventing formation of a continuous electrically conductive loop (shown in FIGS. 17 and 19) around the NFC chip.

Relatedly, an article of jewelry 220 has been developed, which includes a gem 1412; a near field communication (NFC) chip 1414; and a bezel 1416, wherein the bezel 1416 is formed at least in part from an electrically conductive material, further wherein the bezel 16 is switchable between an open configuration, where opposing ends 1416A, 1416B of the bezel are not joined, that permits near field communication with the NFC chip 1414 and a closed configuration 1414, where opposing ends 1416A, 1416B of the bezel 1416 are electrically joined, that prevents near field communication with the NFC chip.

An implication of the above is that a method of protecting data stored on a near field communication (NFC) chip 1414 within article of jewelry 220 has also been developed. In an exemplary method, an article of jewelry 220 is provided in a closed configuration, wherein the article of jewelry 220 includes a precious or semi-precious gem 1412; a near field communication (NFC) chip 1414 with stored data, such as a text, image, video or audio file; and a bezel 1416; wherein the bezel 1416 is formed at least in part from an electrically conductive material, further wherein the bezel 1416 is switchable between an open configuration that permits near field communication with the NFC chip 1414 and the closed configuration that prevents near field communication with the NFC chip 1414.

Relatedly, a method of protecting data has also been developed, which includes providing an article of jewelry 220 in an open configuration, wherein the article of jewelry 220 includes a precious or semiprecious gem 1412, a near field communication (NFC) chip 1414 stored with data, and a bezel 1416, wherein the bezel 1416 is formed at least in part from an electrically conductive material, further wherein the bezel 1416 is switchable between the open configuration that permits near field communication with the NFC chip 1414, and a closed configuration that prevents near field communication with the NFC chip 1414; providing an NFC enabled device 210; writing data to the NFC chip 1414 with the NFC enabled device 210; and closing the bezel 1414 to the closed configuration thereby protecting the data stored on the NFC chip 1414. The method can further include opening the connector 1418 to again permit near field communication with the NFC chip 1414 and accessing the data through near field communication with an NFC enabled device 210.

The semiprecious or precious gems 1412 can be selected from a variety of available gemstones or replica gemstones having a conductivity less than 103 S/m. In other embodiments the gem is an artificial gem or a replica of a gem, where the artificial gem or replica is not electrically nonconductive.

The article of jewelry 220 can be embodied in various forms such as a ring, an earring, a pendant, among other articles of jewelry 220. In some instances, two or more jewelry articles 220, each embedded with a NFC chip 1414 are arranged along a strand to form a necklace or bracelet. By providing an NFC locking mechanism each article of jewelry 220 can be accessed individually by selectively connecting or disconnecting the connector 1418 across the gap 1420 of each bezel 1416.

While it is envisioned that a variety of mechanisms can be used, in each of the embodiments the bezel 1414 is opened and closed by displacement of an electrically conductive connector 1418 across the gap 1420. In some embodiments, this can be accomplished by providing the connector 1418 with two ends, wherein a first end is fixedly connected to a first end 1416A of the bezel 1416 and a second end of the connector 1418 is reversibly connectable to a second end 1416B of the bezel 1416. In such an embodiment, removing connection opens the bezel 1316 to permit near field communication with the NFC chip 14 and closing the connection bridges opposing ends 1416A, 1416B across the gap 1420 to form a continuous electrically conductive loop to prevent near field communication with the NFC chip 1414. This can be further embodied by providing the first end of the connector hinged 1422 to the bezel 1416.

In another embodiment, the entire connector 1418 is displaced from the bezel 1416. In some embodiments, the connector 1418 is a metallic ring that removably rests along the Upper perimeter of the bezel 1416 to reversibly bridge the gap 1420 to join opposing ends 1416A, 1416B. In further embodiments, the article of jewelry 220 is a ring and the connector 1418 is also a ring of a same ring size, which provides a jewelry set. In still another embodiment, the connector 1418 is a dial, which can be turned to electrically connect and electrically disconnect opposing ends 1416A, 1416B of the bezel 1416 to form or break an electrically conductive continuous loop around the NFC chip 1414.

Thus, permitting and preventing communication with the NFC chip 1414 is regulated by opening and closing a continuous electrical circuit around the bezel 1416, preferably by use of the connector 1418. Closing the bezel 1418 forms a continuous loop of the electrically conductive material around the perimeter of the NFC chip 1414 to interfere with near field communication with the NFC chip 1414. In some embodiments the bezel 1416 formed from a metal. In some embodiments the bezel 1416 is sliver. In other embodiments the bezel 1416 is gold.

Figure 18:
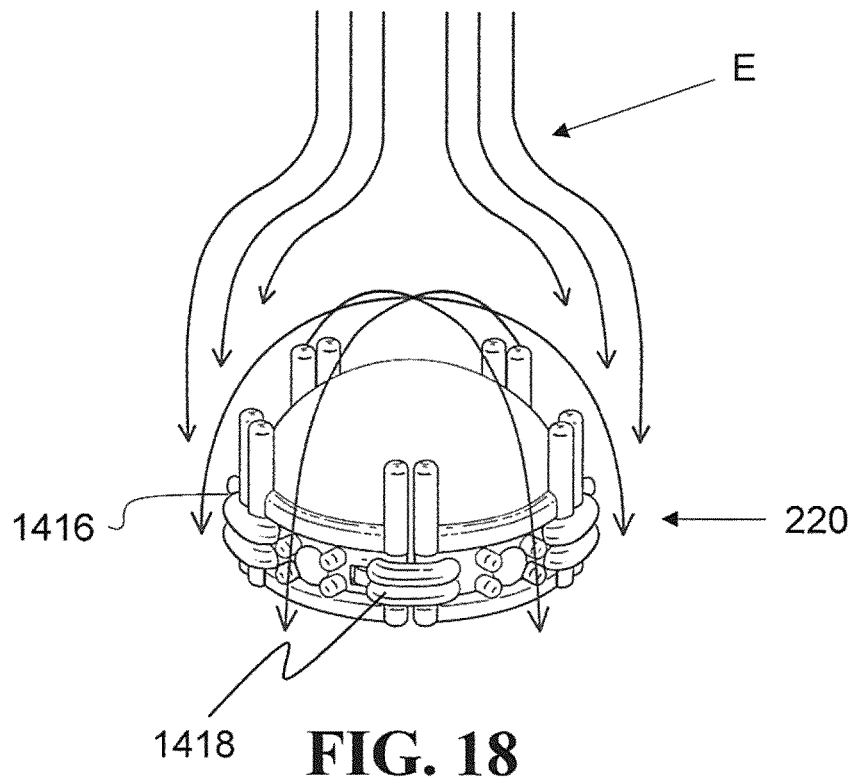
FIG. 18 depicts diversion of an electric field E from an NFC enabled device (not shown) around the article of jewelry 220 when the connector 1418 and bezel 1416 are in the closed configuration, in accordance with an embodiment of the present invention.
Figure 19:
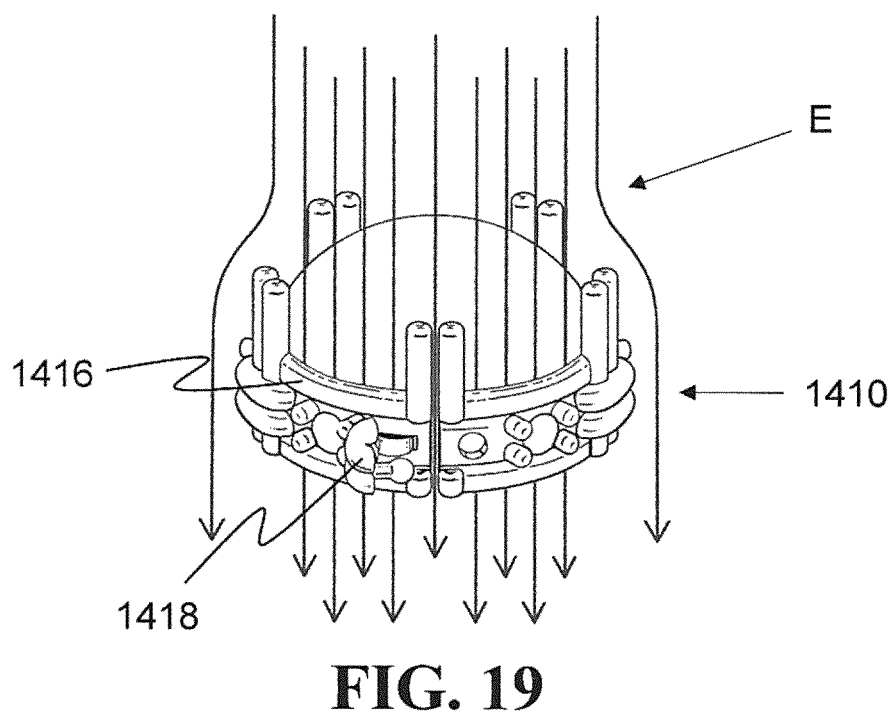
FIG. 19 depicts permitting near field communication by permitting the electric field E to access inside the article of jewelry 220 by opening the connector 1418, which forms a break in the continuous electrically conductive loop of FIG. 18, in accordance with an embodiment of the present invention.

Turning again back to the embodiment depicted in FIGS. 16-19, the connector 1418 is able to reversibly bridge the gap 1420 to connect opposing ends 1416A, 1416B of the bezel 1416, thereby reinstating a continuous electrical loop around the NFC chip 1414, and thus preventing near field communication with the NFC chip 1414. The connecting structure 1418 is itself preferably formed of a highly electrically conductive material, such as a metal having a conductivity of $10^7$ S/m or more. The connecting structure 1418 acts to open or close the gap 1420 in the bezel 1416, thus breaking or rejoining a continuous, electrically conductive loop. As shown in FIG. 18, it is believed, though not bound by theory, that when the loop created by a connected bezel 1416 is permitted to conduct electricity in a continuous loop, it disrupts the electric field E generated by an NFC enabled device 210 (not shown), which prevents communicating with the NFC chip 1414 located in the article of jewelry 220. As shown collectively in FIGS. 17 and 19, when the continuous electrically conductive loop of the bezel 1416 is broken by opening the connector 1418 from at least one of the ends 1416A, 1416B of the bezel 1416 to expose the gap 1420, the electric field E from an NFC enabled device 210 is permitted to pass into the article of jewelry 220 to communicate with the NFC chip 1414, thereby permitting the transfer of information to the NFC chip 1414, or permitting retrieval of information from the NFC chip 1414. In this manner, the connecting structure 1418 acts as a security measure, shielding the NFC chip 1414 from outside electric fields E when the gap 1420 is closed, and allowing transfer of information when the gap 1420 is opened.

The gap 1420 can be 1 mm or larger, but gaps 1420 of 0.5 mm, 0.2 mm and smaller also being envisioned. In some embodiments the gap 1420 is between 1 mm and 5 mm. Gaps 1420 larger than 5 mm are also encompassed by the invention. In some embodiments, the gap 1420 is 1 cm. In some embodiments the gap 1420 is 2.5 mm. Thus, the gap 1420 is preferably defined as the absence of electrically conductive material thereby providing a gap in conductivity; however, a gap 1420 formed as a nonconductive material, such as plastic, could nonconductively join opposing ends 1416A, 1416B or end regions of the bezel.

The connecting structure 1418 preferably has two ends, where the first end is permanently connected to a first end 1416A of the bezel 1416 and the second end being reversibly connected to the second end 1416B of the bezel 1416. One way to permanently connect one end of the connecting structure 1418 to the bezel 1416A is with a hinge 1422, shown in FIG. 17.

Manufacture of the article of jewelry 220 can be accomplished by positioning the NFC chip 1414 beneath, above or within a desired gem 1412 and positioning an electrically conductive bezel 1416 along a same plane as and substantially around the NFC chip 1414, such that the bezel 1416 can be reversibly closed to permit and deny near field communication between and NFC enable devices 210, such as a smart phone, and the NFC chip 1414. Manufacture can also include mounting a gem 1412 and NFC chip 1414 by gluing the gem 1412 or NFC chip 1414 to one or more nonconductive substrates 1424A, 1424B. To this end, the article of jewelry 220 can include a substrate 1424A, 1424B wherein the gem 1412 and the NFC chip 1414 are mounted to the substrate 1424A, 1424B. In further embodiments, the substrate 1424A, 1424B can include a lower substrate layer 1424B and an upper substrate layer 1424A separating the gem 1412 from the NFC chip 1414. In still further embodiments, the upper layer 1424A is formed from mother of pearl. To this end, the substrates 1424A, 1424B should be formed essentially of a nonconductive material.

By providing an article of jewelry 220 with a housed NFC chip 1414 that is rewritable, an article of jewelry 220 has been developed having hidden memory that can be rewritten numerous times to couple memories or personal expressions that can be enjoyed while viewing the jewelry 220. The files can be audio files, image files, text files, executable instructions, video files, database files and other transferable data files. As will become evident, the jewelry 220 will be able to communicate with mobile devices, such as NFC-enabled mobile phones 210 having a suitable software application so that personal communication or expressions can be enjoyed in concert with the jewelry 220. NFC communication is accomplished by opening the connector 1418 to break the continuous electrically conductive loop around the NFC chip 1414, and positioning the article of jewelry 220 next to or against the NFC enabled device 210. Once positioned, the NFC enabled device 210 initiates communication with the NFC chip 1414 through an electric field E. The electric field E powers the passive NFC chip 1414 which permits responsive communication. The NFC chip 1414 communicates a message to the NFC enabled device 210, which can launch an application opening an image, video or audio file or direct a web browser to an Internet web page.

Developing the article of jewelry 220 required overcoming technical challenges with respect to combining NFC technology, metals, and conventional jewelry design. For instance, it was found that housing an NFC chip 1414 within an article of jewelry 220 completely encircled by a silver or gold bezel 1416 prevented communication between the NFC chip 1414 and an NFC enabled device 210. Since many articles of jewelry 220, such as pendants hanging from necklaces or bracelets, are traditionally formed with a gold or silver bezel 1416 it was believed an NFC chip 1414 could not be housed in such articles of jewelry 220. Therefore, it was believed that the bezel 1416 must be formed from an electrically nonconductive material, such as a plastic. However, surrounding a gemstone with a bezel 1416 formed from a nonconductive material would be considered a cheap alternative in the jewelry field and would not be an acceptable substitution. Precious metals such as gold and silver are highly desired. It was unexpectedly found that communication between the NFC chip 1414 and NFC enabled mobile device could be restored by removing the continuous nature of the silver or gold bezel 1416 around the NFC chip 1414. That is, by cutting the gold or silver bezel 1416 to form a gap 1420 and thus break the continuous nature of the NFC interfering loop, near field communication with the housed NFC chip 1414 could be reestablished. Therefore, it was surprisingly found that providing a small gap 1420 of only about a millimeter of an open ended bezel 1416A, 1416B would permit NFC communication.

The article of jewelry 220 has been measured to operate using near field communication at a maximum of only a few centimeters or less, thereby permitting near field communication between the article of jewelry 220 and only a closely positioned NFC enabled device 210. Preferably, communication between the NFC chip 1414 and NFC enable device 210 occurs selectively within 10 cm, more preferably within 2 cm. By limiting the distance of communication, messages or expressions can be shared privately without concern of foreign NFC enabled devices 210 outside of the communication distance. However, further improvements have been developed so that the gap 1420 coupled with a displaceable connector 1418 offer an additional layer of security to the NFC chip 1414. These measures are particularly useful when writing or retrieving personal messages or communications in areas of high population density, such as while on a bus or shuttle service, subway, train, in a crowded restaurant or other areas where NFC enabled devices 210 can be found in high density. In addition, by providing such a short distance of communication together with a closeable gap 1420, the likelihood of theft or overwriting the NFC memory by others, whether intentional or not, is significantly reduced. It also permits malicious writing of code that could infect an NFC enabled device 210.

Figure 14:
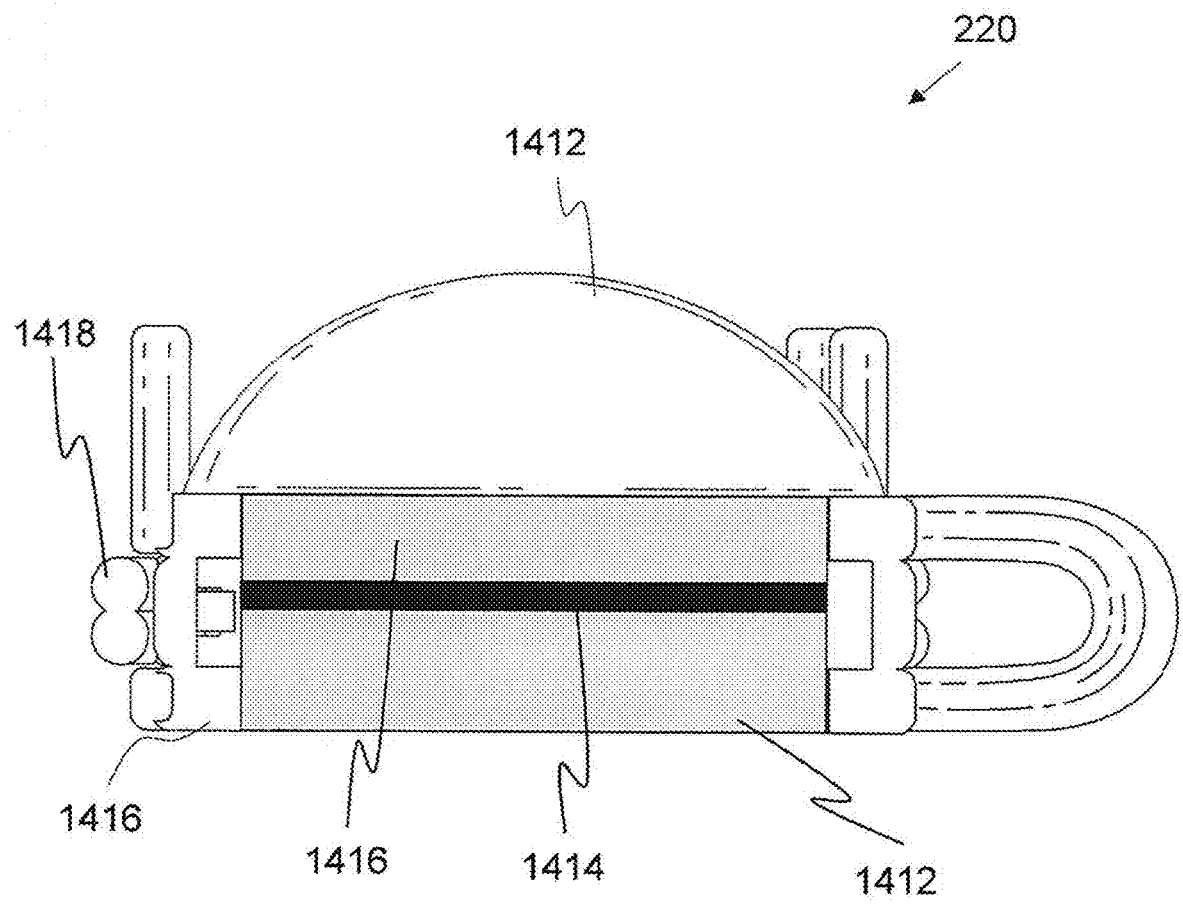
FIG. 14 is a cutaway view of an article of jewelry 220, where beneath a gemstone 1412 is a hidden NFC chip 1414, and around which is a bezel 1416 with connector 1418 in a dosed configuration preventing near field communication with the NFC chip 1414, in accordance with an embodiment of the present invention.
Figure 15:
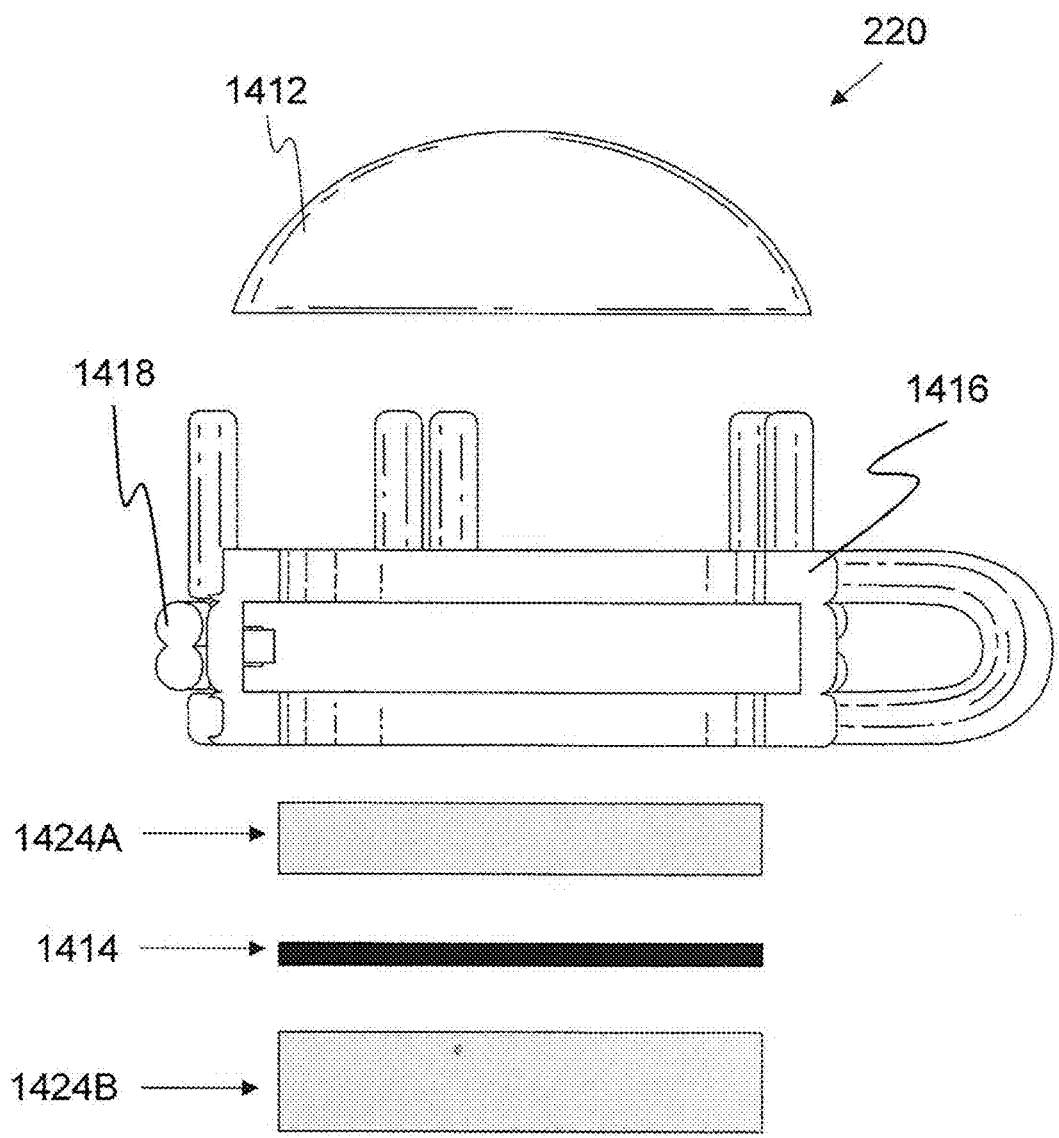
FIG. 15 is a cutaway and exploded view of the article of jewelry 220 shown in FIG.14, in accordance with an embodiment of the present invention.
Figure 16:
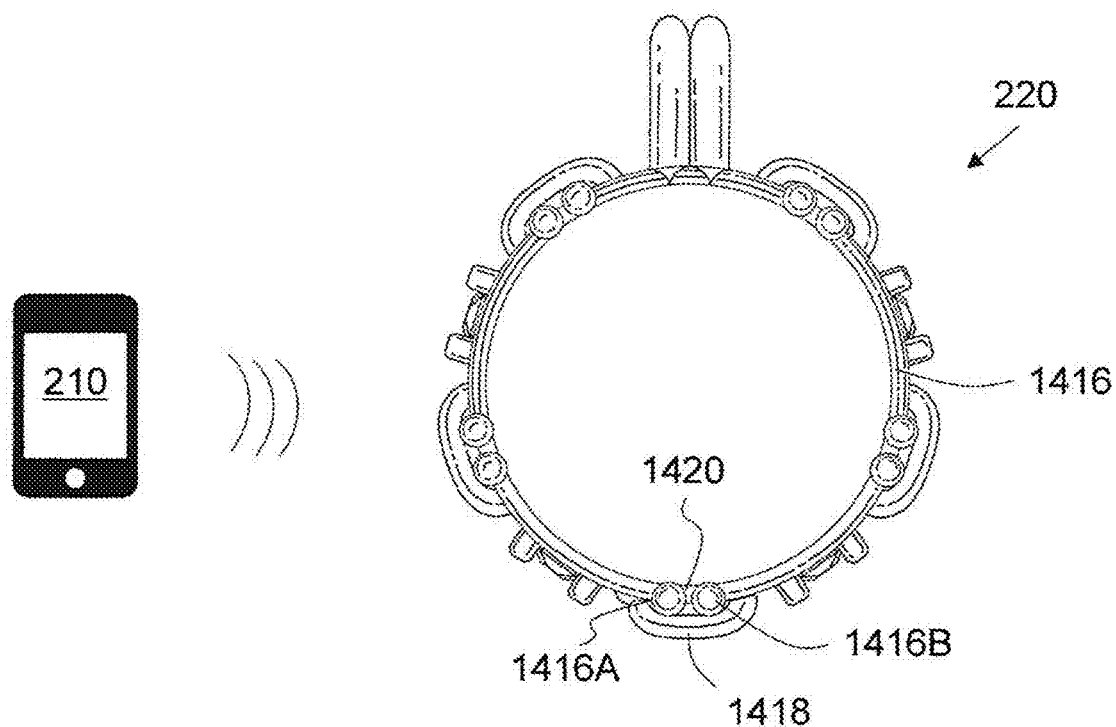
FIG. 16 is a top view of the article of jewelry 220 shown in FIG. 14, showing the connector 1418 closing the gap 1420 between opposing ends 1416A, 1416B of the bezel 1416 to form a closed configuration defined by a continuous electrically conductive loop, in accordance with an embodiment of the present invention.
Figure 17:
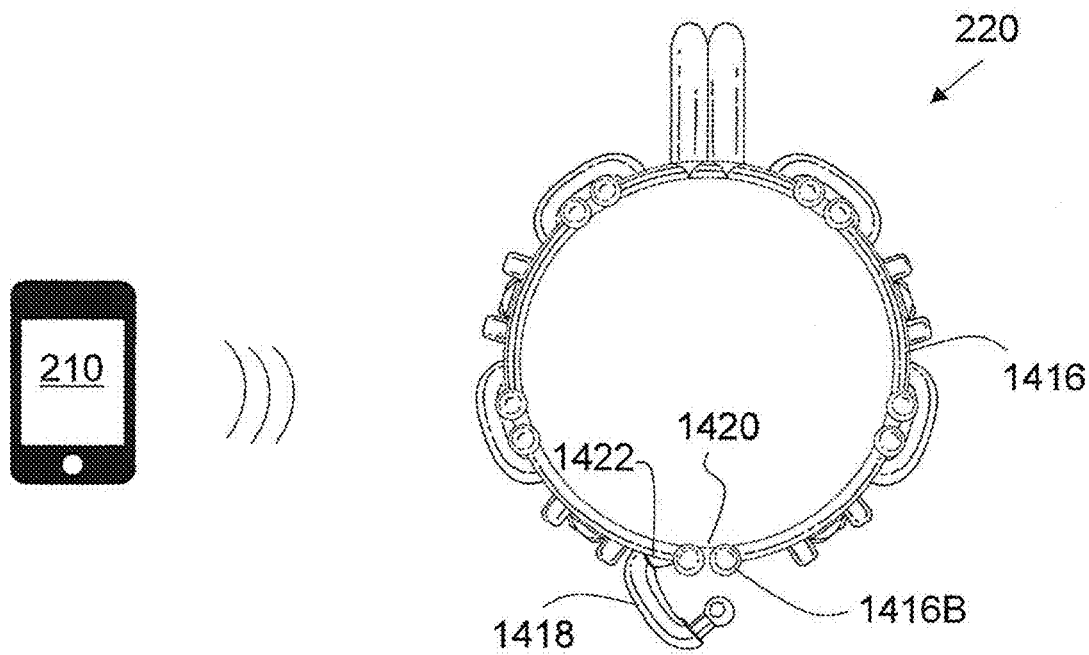
FIG. 17 is a top view of the article of jewelry 220 shown in FIG. 14, depicted in an open configuration defined by the connector 1418 removed from connection from one of the ends 1416B of the bezel 1416 thereby permitting the gap 1420 to prevent a continuous electrically conductive loop and thus prevent near field communication, in accordance with an embodiment of the present invention.

Since NFC chips 1414 are quite thin and fragile, as shown in FIGS. 14 and 15, the near field communication (NFC) chip 1414 can be housed or sandwiched between two nonconductive or insulated substrates 1424A, 1424B. The substrates 1424A, 1424B can be affixed to one another, thereby minimizing mechanical forces applied to the fragile NFC chip 1414. The NFC chip 1414 may be secured to the lower substrate 1424B using an adhesive, such as double sided tape or glue. In another approach, the lower substrate 1424B is formed from a polymer and prior to curing or during hardening, the NFC chip 1414 is layered over the polymer such that the lower substrate 1424B hardens or cures while the NFC chip 1414 is present for casting integral to the lower substrate 1424B. This can be accomplished by adding the NFC chip 1414 to a cooling polymer melt or adding the NFC chip 1414 together with or after adding a hardening catalyst as known in the polymer arts. Suitable, nonlimiting examples of polymers include polyethylene terephthalate (PET) and polypropylene.

The upper substrate 1424A is preferably planar, layered over the NFC chip 1414 and is preferably affixed to the lower substrate 1424B. The upper substrate 1424B is preferably opaque and therefore prevents users from visually identifying the NFC chip 1414. The circumference of the upper substrate 1424A is preferably equal to or less than the circumference of the lower substrate 1424B. In preferred embodiments, the upper substrate 1424A also adds to the desirability of the jewelry 220 by itself being formed from a precious or semiprecious material that can be viewed at least partially through the transparent or semi-transparent outer gemstone 1412 covering. In some embodiments, the upper substrate 1424A is a planar slice of an opaque gemstone, such as an agate. In a preferred embodiment, the upper substrate 1424A is formed from mother of pearl.

In furtherance of the above, the bezel 1416 can be formed to substantially encircle the NFC chip 1414 by substantially encircling the upper and lower substrates 1424A, 1424B. The bezel 1416 extends along a same plane as the NFC chip 1414 but also has a height that extends above and below the plane defined by the NFC chip 1414. The bezel 1416 is preferably formed from a highly conductive material, such as silver or gold, which permits the efficient flow of electrical current. As indicated above, a challenge with using a highly electrically conductive metallic bezel 1414 is that when completely encircling an NFC chip 1414, communication between the NFC chip 1414 and NFC enable device 210 is lost. Accordingly, while the bezel 1416 of the invention can be formed from metals and metal alloys, such as silver or gold, there is a technical challenge to overcome in that providing a continuous ring of such a material along the same plane and around the NFC chip 1414 forms an NFC interfering loop, which prevents near field communication. However, it was surprisingly found that disrupting the continuous loop of a silver or gold bezel 1416 resulted in successful communication between the NFC enabled device 210 and NFC chip 1414. It was then surprisingly found by providing a reversibly connectable connector 1418, data stored on the NFC chip could be selectively accessed and selectively protected from transfer.

To assist the artisan in selecting suitable materials, TABLE 1 provides a listing of materials used in the jewelry arts and provides their corresponding electrical conductivity. As general guidance gold and silver, which are highly electrically conductive, can form a bezel 1416 with a highly conductive continuous loop. It was also found that opposing ends of a length of silver extending substantially but not completely around the outer perimeter of an NFC chip 1414 could be joined by conventional jewelry grade titanium without loss of NFC signal. This suggests titanium could be an appropriate material for the connector 1411B when using a silver bezel 1416. As such, highly conductive materials of about $10^7$ Siemens per meter (S/m) tend to require a gap 1420 between opposing ends 1416A, 1416B to retain near field communication with a housed NFC chip 1414. Lesser conductive materials of about $10^6$ S/m tend to be useful as connectors 1418 depending on the gap 1420 width but not particularly useful as a bezel 1416.

TABLE 1

| Material | Conductivity (S/m at 20° C.) |
|---|---|
| Silver | $6.3 \times 10^7$ |
| Copper | $5.96 \times 10^7$ |
| Gold | $4.10 \times 10^7$ |
| Aluminum | $3.50 \times 10^7$ |
| Tungsten | $1.79 \times 10^7$ |
| Zinc | $1.69 \times 10^7$ |
| Nickel | $1.43 \times 10^7$ |
| Iron | $1 \times 10^7$ |
| Platinum | $9.43 \times 10^6$ |
| Tin | $9.17 \times 10^6$ |
| Carbon steel | $6.99 \times 106$ |
| Titanium | $2.38 \times 106$ |
| Stainless steel | $1.45 \times 106$ |
| Glass | $1 \times 10-11$ to $10-15$ |
| Rubber | $1 \times 10-14$ |
| Fused quartz | $1.30 \times 10-18$ |

Figure 20:
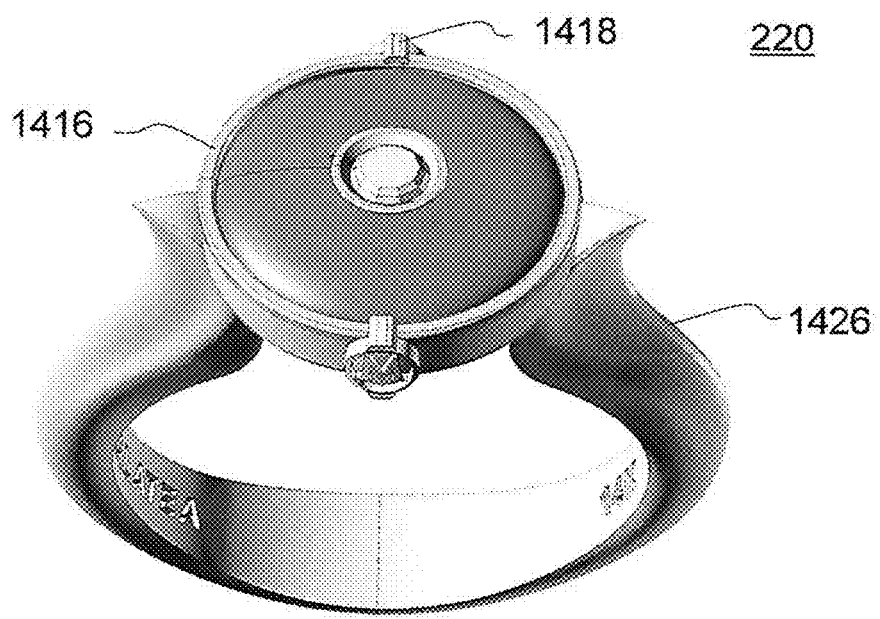
FIG. 20 is an article of jewelry 220 embodied as a ring with removable connectors 1418, in accordance with an embodiment of the present invention.
Figure 21:
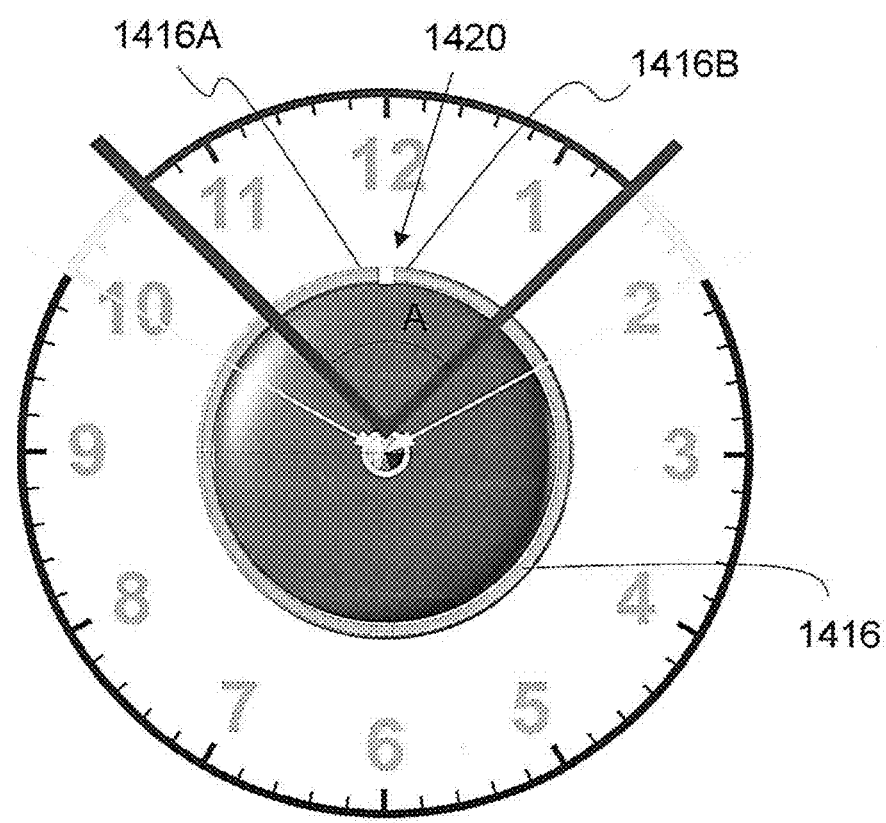
FIG. 21 shows a gap 1420 separating opposing ends 1416A, 1416B of the bezel 1416 overlaying a clock for reference for the positioning of the loop 1426 of FIG. 20, in accordance with an embodiment of the present invention.

When embodying the article of jewelry 1410 as a ring (shown in FIG. 20), there exists even another set of challenges. Rings are conventionally formed with hoops 1426 made from highly conductive materials such as gold or silver. It was envisioned that a gold or silver hoop 1426 would again establish an NFC interfering loop even when the connector 1418 is in an open position; however, as show in FIG. 21, where the gap 1420 is positioned relatively at 12 o'clock, as long as the pair of connections of the hoop 1426 to the bezel 1416 were outside of the angle A formed between about 10:30 and 1:30 (about 90 degrees apart), or more reliably between about 10 and 2 o'clock, NFC communication could be maintained. Thus, it was found that the relationship between the gap 1420 and the hoop 1426 of the ring, and presumably hoop of earrings and other hoops, should be about 90 degrees apart from one another to permit near field communication with the NFC chip 1414.

In view of the above, the skilled artisan will appreciate that the article of jewelry 220 can be adapted for use in a variety of forms, including a pendent for a necklace or charm for a bracelet, an earring, a ring and other forms of jewelry.

Now, turning to FIGS. 22-25, the invention also provides an article of jewelry 2200 having a precious or semiprecious gem 2212; a near field communication (NFC) chip 2214; and a bezel 2216 substantially but not entirely surrounding the NFC chip 2214, wherein the bezel 2216 is formed of an electrically conductive material, further wherein the article of jewelry 2200 is switchable between a closed configuration defined by a continuous electrically conductive loop encircling the NFC chip 2214 and an open configuration defined by a break in the electrically conductive loop.

Figure 22:
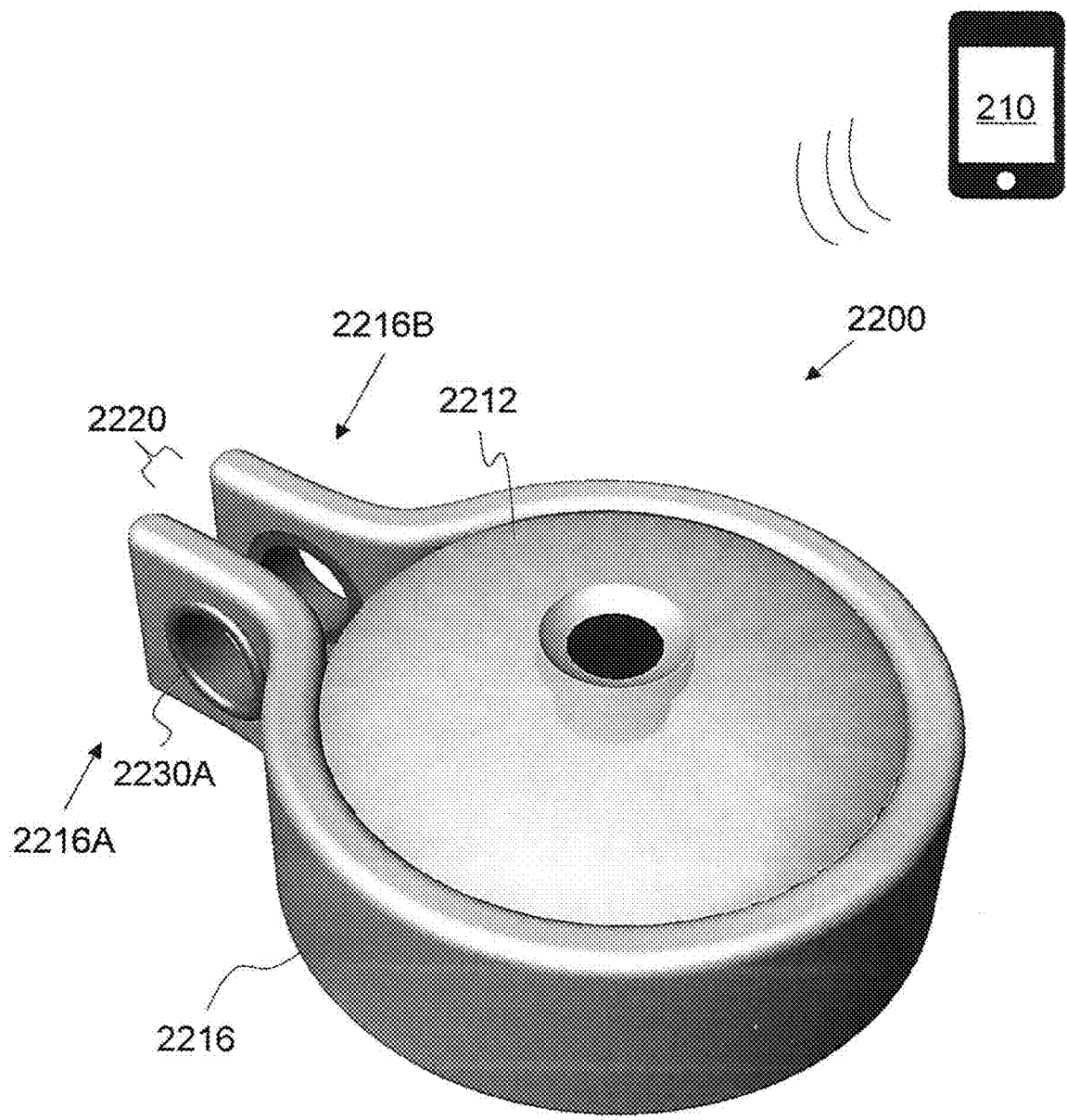
FIG. 22 is a perspective view showing another embodiment of the article of jewelry 220 with a nonconductive collar 2230A, in accordance with an embodiment of the present invention.
Figure 23:
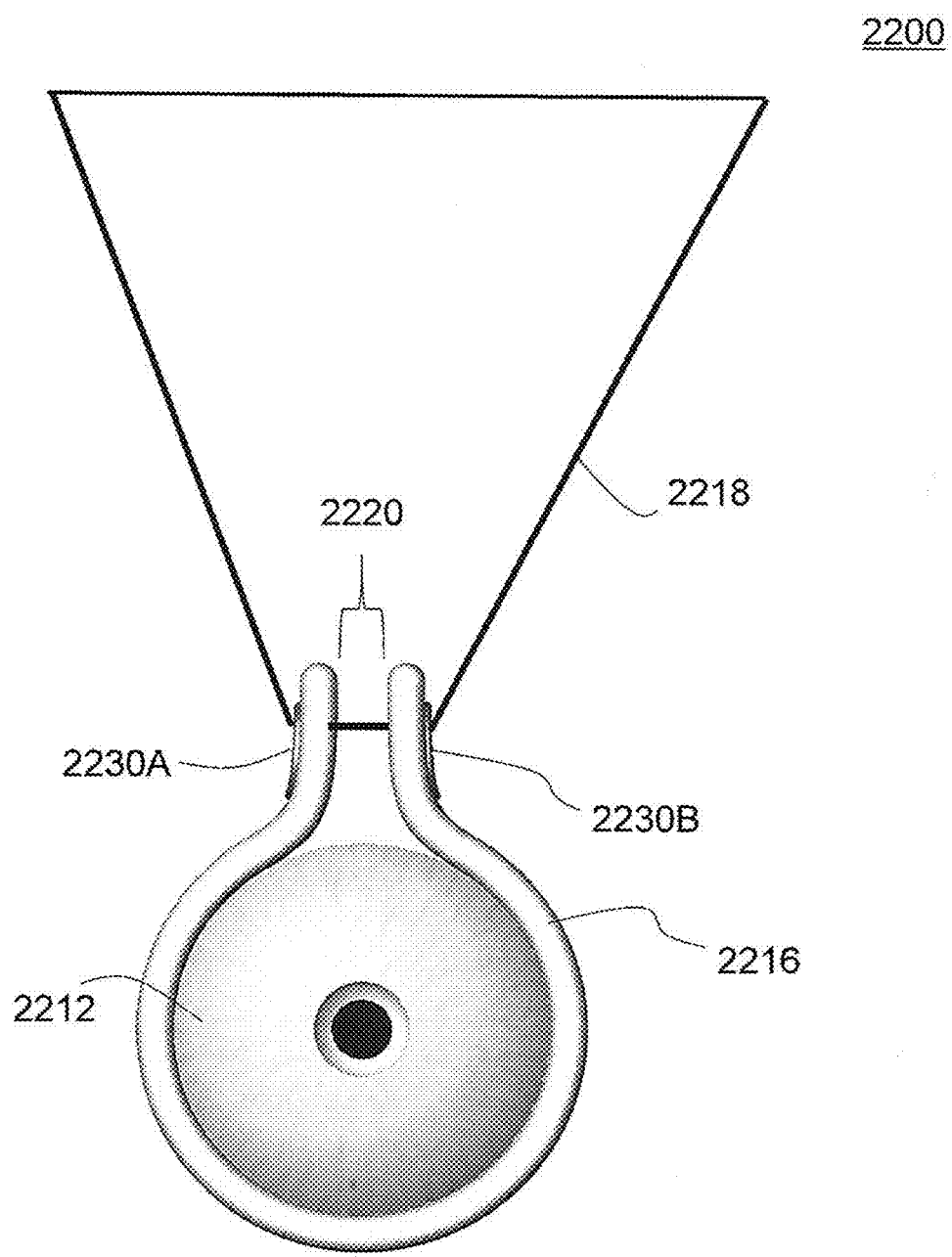
FIG. 23 depicts the article of jewelry shown in FIG. 22 embodied as a necklace in a locked configuration, in accordance with an embodiment of the present invention.

As with the embodiment shown in FIGS. 14-17, in the embodiment of FIGS. 22-23 the bezel 2216 is formed from an electrically conductive material such as silver or gold and can be a noncontinuous ring having opposing ends separated by a gap 2220; however, in the article of jewelry 2200 shown in FIGS. 22-23 the opposing ends 2216A, 2216B are flanged outward, bored to provide throughbores, and fitted with insulating or nonconductive collars 2230A, 2230B. When fitted, the collars 2230A, 2230B prevent electrical connection between the bezel 2216 and an electrically conductive substrate 2218 (also referred to as a connector) threaded through the collars 2230A, 2230B as shown in FIG. 23. Thus, when fitted with the collars 2230A, 2230B, near field communication is permitted with the NFC chip 2214, which defines an open configuration that is open to communication with an NFC enabled device 210. When the collars 2230A, 2230B are removed from the throughbore, such as slid out of a friction fitting with the throughbores, slid out of a tongue and groove fitting with the throughbores, or unscrewed from the throughbores, the electrically conductive substrate 2218 is permitted to contact the opposing ends 2216A, 2216B of the bezel 2216 to establish an electrically conductive loop, which interferes with near field communication with the NFC chip 2214 thus establishing a closed configuration that protects data stored on the NFC chip 2214.

In a related embodiment shown in FIG. 24, the collars 2230A, 2230B are rotatable within the throughbore and have a slot 2232 that separates opposing ends of the collar 2230A, 2230B. By separating the ends of a rotatable collar 2230A, 2230B, rotation of the collar 2230A, 2230B permits the slot 2232 to be aligned with the electrically conductive substrate 2218, which permits electrical contact between the electrically conductive substrate 2218 and the bezel 2216 thereby defining a closed configuration that interferes with or prevents communication between the NFC chip 2214 and an NFC enabled device 210. The collar 2230 can then be further rotated to misalign the slot 2232 with the electrically conductive substrate 2218 to permit electrical contact between the electrically conductive substrate 2218 and the bezel 2230, thereby defining a closed configuration that allows communication between the NFC enabled device 210 and the NFC chip 2214.

Figure 25:
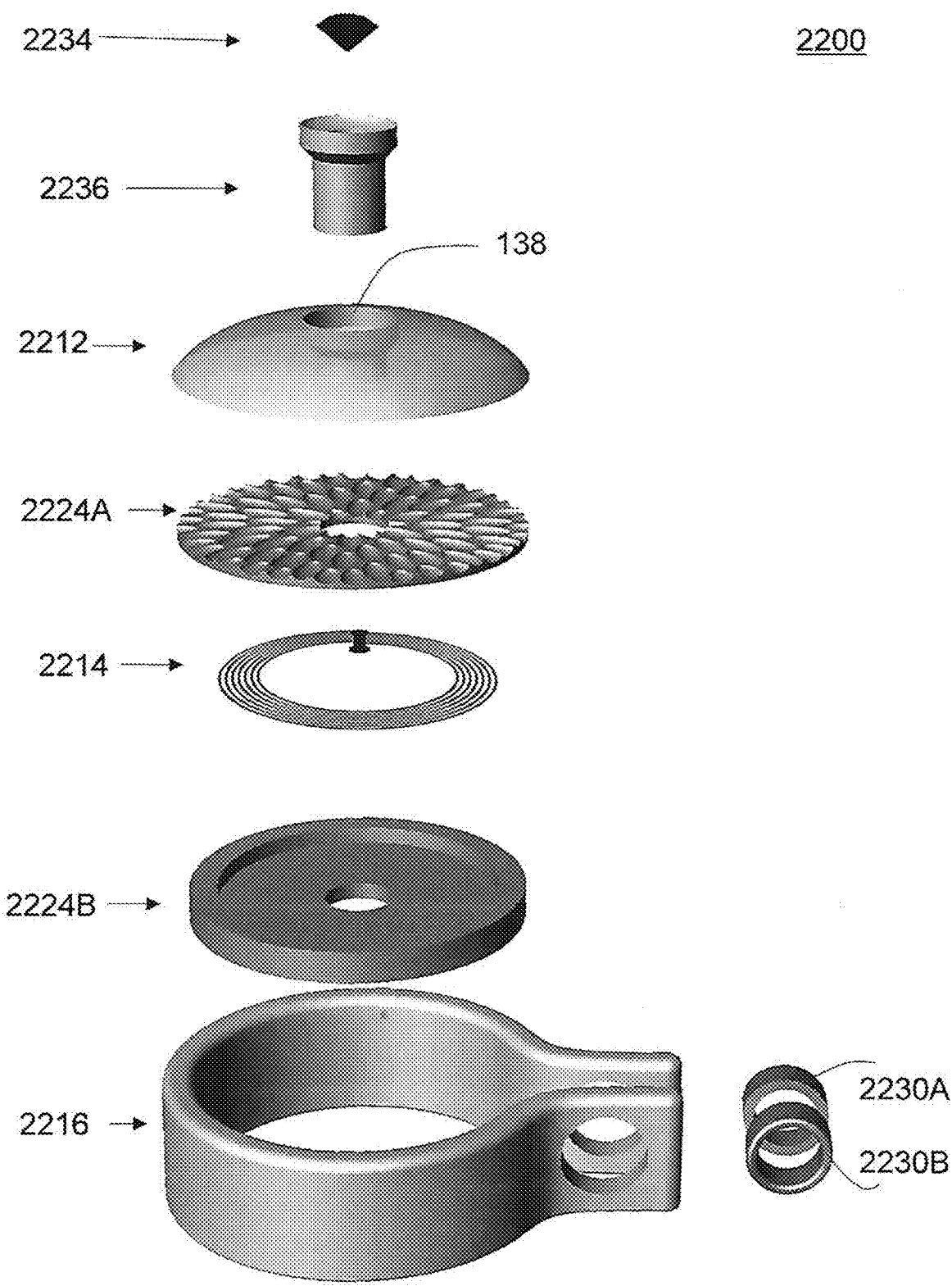
FIG. 25 is an exploded view of the article of jewelry 2200 of FIG. 22, in accordance with an embodiment of the present invention.

Turning to FIG. 25, an exploded view of an exemplary article of jewelry 2200 is provided, which shows how a NFC chip 2214 can be securely housed and surrounded by a bezel 2216. The NFC chip 2214 can be layered between an upper substrate 2224A (shown as mother of pearl) and a lower substrate 2224B, each being nonconductive. In this case, a semi-transparent gem 2212 (sufficiently transparent to permit viewing of the mother of pearl) can be layered over the upper substrate 2224A. Also in this variation a secondary gem 2234 is mounted to a mount 2236 that is fitted into an aperture 2238 of the gem 2212.

With reference to FIGS. 22-25, the invention also provides an article of jewelry 2200 for protecting data stored on a near field communication (NFC) chip 2214; and a method for protecting data stored on a near field communication (NFC) chip 2214 within an article of jewelry 2200, the method including providing an article of jewelry 2200 in a closed configuration, wherein the near field communication (NFC) chip 2214 includes data. In some embodiments, the method includes an article of jewelry 2200 with an electrically conductive substrate 2218 threaded through collars 2230A, 2230B, wherein the collars 2230A, 2230B interfere with electrical connection between the bezel 2216 and the substrate 2218.

Similarly, the invention provides a method of protecting data, which includes providing an article of jewelry 2200 in an open configuration, wherein the article of jewelry 2200 includes a precious or semiprecious gem 2212, a near field communication (NFC) chip 2214 loaded with data, and a bezel 2216, wherein the bezel 2216 is formed of an electrically conductive material, further wherein the article of jewelry 2200 is switchable between the open configuration that permits near field communication with the NFC chip 2214, and a closed configuration that prevents near field communication with the NFC chip 2214; providing an NFC enabled device 210; writing data to the NFC chip 2214 with the NFC enabled device 210; and closing the article of jewelry 2200 to the closed configuration.

As is evident in view of FIGS. 22-25, the article of jewelry 2200 used for protecting data can include bezel 2216 with opposing ends 2216A, 2216B separated by a gap 2220, each opposing end 2216A, 2216B having a throughbore and a removable collar 2230A, 2230B configured to fit in the throughbore, wherein the collars 2230A, 2230B are formed from a nonconductive material, further wherein the closed configuration defined by collars 2230A, 2230B removed from the throughbores and an electrically conductive substrate electrically connecting the opposing ends 2216A, 2216B of the bezel 2216 and the open configuration defined by the collars 2230A, 2230B fitted within the throughbores and interfering with electrical connection between the electrically conductive substrate 2218 and the bezel 2216.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A Near Field Communication (NFC) payment system comprising:
an NFC customer device of a possessing user having a NFC scanning capability;
a NFC-scannable user-worn payment ring of the possessing user directly communicating only with the NFC customer device to execute a terminal-less payment transaction in collaboration with the NFC customer device of the possessing user, the communication between the NFC-scannable user-worn payment ring and the NFC customer device being devoid of any external online website or offline physical store payment terminal, and the terminal-less payment transaction initiated by tapping the NFC-scannable user-worn payment ring on the NFC customer device without sharing banking and personal information with the NFC customer device; and
a payment server, operatively coupled to the NFC customer device,
wherein the terminal-less payment transaction involves a payment made from the NFC scannable user-worn payment ring directly through the NFC customer device and then directly to the payment server.

2. The NFC payment system of claim 1, wherein the NFC-scannable user-worn payment ring comprises a memory device storing information for the possessing user as at least one of a payor and a payee.

3. The NFC payment system of claim 1, wherein the NFC-scannable user-worn payment ring comprises a memory device storing information for the possessing user as both the payor and the payee.

4. The NFC payment system of claim 1, wherein the NFC-scannable user-worn payment ring comprises a user-openable and closable physical lock unforming and forming an electrical connection for putting the NFC-scannable user-worn payment ring in any of a communication-physically-locked mode and a communication-physically-unlocked mode responsive to a selected lock position.

5. The NFC payment system of claim 4, wherein the physical lock comprises a moveable metal shield.

6. The NFC payment system of claim 1, wherein the NFC customer device is a mobile smart phone.

7. The NFC payment system of claim 1, wherein the NFC customer device is a mobile smart watch.

8. The NFC payment system of claim 1, wherein a user identifier and at least one card number, selected from the group consisting of a credit card number and a debit card number, are stored in the NFC-scannable user-worn payment ring, and are output to the NFC customer device using an encrypted communication protocol responsive to a payment initiating scan of the NFC-scannable user-worn payment ring by the NFC customer device.

9. The NFC payment system of claim 1, wherein a user identifier and at least one bank routing number, are stored in the NFC-scannable user-worn payment ring, and are output to the NFC customer device using an encrypted communication protocol responsive to a payment initiating scan of the NFC-scannable user-worn payment ring by the NFC customer device.

10. The NFC payment system of claim 1, wherein a user identifier and payment information relating to a user payment entity are output to the NFC customer device for temporary storage responsive to a payment initiating scan of the NFC-scannable user-worn payment ring by the NFC customer device, and wherein the user identifier and the payment information are temporarily stored in the NFC customer device and thereafter discarded responsive to a transmission of the user identifier and the payment to a remote payment server processing the user identifier and the payment information to complete the terminal-less payment transaction.

11. The NFC payment system of claim 1, wherein the terminal-less payment transaction is capable of being performed when the NFC-scannable user-worn payment ring is located in scannable position relative to the NFC customer device in an absence of a multi-user-shared terminal device.

12. The NFC payment system of claim 1, wherein the NFC customer device has a NFC customer device scannable NFC physical tag encoded with a unique identifier of a user and information for the possessing user as at least one of a payor and a payee.

13. The NFC payment system of claim 1, further comprising a NFC management server (i) generating a customer payable invoice for the terminal-less payment transaction, responsive to receiving a confirmation of a customer actuating a pay button provided on the NFC customer device, and (ii) transmitting the customer payable invoice to the NFC customer device.

14. The NFC payment system of claim 1, wherein a plurality of customer selectable electronic payment services comprises at least one e-banking system internal to and implemented by a respective one of a plurality of sellers of products and services.

15. A method for using Near Field Communication (NFC), the method comprising:
    configuring an NFC customer device of a possessing user having a NFC scanning capability;
    configuring a NFC-scannable user-figure-worn payment ring of the possessing user directly communicating only with the NFC customer device to execute a terminal-less payment transaction in collaboration with the NFC customer device of the possessing user, the communication between the NFC-scannable user-worn payment ring and the NFC customer device being devoid of any external online website or offline physical store payment terminal, and the terminal-less payment transaction being initiated by tapping the NFC-scannable user-worn payment ring on the NFC customer device without sharing banking and personal information with the NFC customer device; and
    configuring a payment server to be operatively coupled to the NFC customer device,
    wherein the terminal-less payment transaction involves a payment made from the NFC scannable user-worn payment ring directly through the NFC customer device and then directly to the payment server.

16. The method of claim 15, wherein the NFC-scannable user-worn payment ring comprises a memory device storing information for a user as both the payor and the payee.

17. A computer program product for using Near Field Communication (NFC), the computer program product comprising a non-transitory computer readable storage medium having program instructions embodied therewith, the program instructions executable by a computer to cause the computer to perform a method comprising:
    configuring an NFC customer device of a possessing user having a NFC scanning capability;
    configuring a NFC-scannable user-figure-worn payment ring of the possessing user directly communicating only with the NFC customer device to execute a terminal-less payment transaction in collaboration with the NFC customer device of the possessing user, the communication between the NFC-scannable user-worn payment ring lacking any connection to a merchant terminal and the NFC customer device being devoid of any external online website or offline physical store payment terminal, and the terminal-less payment transaction initiated by tapping the NFC-scannable user-worn payment ring on the NFC customer device without sharing banking and personal information with the NFC customer device; and
    configuring a payment server to be operatively coupled to the NFC customer device,
    wherein the terminal-less payment transaction involves a payment made from the NFC scannable user-worn payment ring directly through the NFC customer device and then directly to the payment server.

* * * * *